US009682505B2

(12) United States Patent
Neufarth et al.

(10) Patent No.: US 9,682,505 B2
(45) Date of Patent: *Jun. 20, 2017

(54) INJECTION MOLD HAVING A SIMPLIFIED EVAPORATIVE COOLING SYSTEM OR A SIMPLIFIED COOLING SYSTEM WITH EXOTIC COOLING FLUIDS

(71) Applicant: iMFLUX Inc., Cincinnati, OH (US)

(72) Inventors: Ralph Edwin Neufarth, Liberty Township, OH (US); Niall D Robinson, Newburyport, MA (US); Rainer Scharrenberg, Marburg (DE); Robert Lawrence Prosise, Cincinnati, OH (US); Charles John Berg, Jr., Wyoming, OH (US)

(73) Assignee: IMFLUX INC, Hamilton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,257

(22) Filed: Sep. 19, 2014

(65) Prior Publication Data
US 2015/0064303 A1 Mar. 5, 2015

Related U.S. Application Data

(62) Division of application No. 13/601,359, filed on Aug. 31, 2012, now abandoned.

(Continued)

(51) Int. Cl.
*B29C 45/73* (2006.01)
*B29C 35/16* (2006.01)
(Continued)

(52) U.S. Cl.
CPC ........ *B29C 45/7312* (2013.01); *B29C 33/046* (2013.01); *B29C 35/16* (2013.01);
(Continued)

(58) Field of Classification Search
CPC ..... B29C 45/72; B29C 45/73; B29C 45/7306; B29C 45/7312
(Continued)

(56) References Cited

U.S. PATENT DOCUMENTS 2,350,348 A 6/1944 Gaugler
3,127,753 A 4/1964 Tinnerman
(Continued)

FOREIGN PATENT DOCUMENTS

DE 2427969 A1 1/1976
DE 10256036 A1 6/2004
(Continued)

OTHER PUBLICATIONS

Paul Sager, EDMing Beryllium Copper: An Introduction, Feb. 15, 2001, Modern Machine Shop, pp. 1-6.*
(Continued)

*Primary Examiner* — Jill Heitbrink
(74) *Attorney, Agent, or Firm* — Marshall, Gerstein & Borun LLP

(57) ABSTRACT

An injection mold assembly for a high output consumer product injection molding machine, the injection mold assembly having a simplified cooling system that is an evaporative cooling system or a cooling system including a hazardous, dangerous, or expensive cooling fluid. The simplified cooling system has a cooling fluid channel that is confined to a mold support plate.

5 Claims, 21 Drawing Sheets

Related U.S. Application Data

(60) Provisional application No. 61/641,349, filed on May 2, 2012.

(51) Int. Cl.
*B29C 33/04* (2006.01)
*B29L 31/00* (2006.01)

(52) U.S. Cl.
CPC ...... *B29C 45/7306* (2013.01); *B29C 45/7337* (2013.01); *B29K 2905/02* (2013.01); *B29K 2995/0013* (2013.01); *B29L 2031/757* (2013.01)

(58) Field of Classification Search
USPC .................................................. 425/547, 548
See application file for complete search history.

(56) References Cited

U.S. PATENT DOCUMENTS

| | | | |
|---|---|---|---|
| 4,219,322 A | 8/1980 | Chang et al. | |
| 5,037,592 A | 8/1991 | Erienbach | |
| 5,350,288 A | 9/1994 | Kimoto et al. | |
| 5,407,342 A | 4/1995 | Boucher et al. | |
| 5,411,686 A | 5/1995 | Hata | |
| 5,419,858 A | 5/1995 | Hata et al. | |
| 5,437,547 A * | 8/1995 | Holton | B29C 33/04 249/80 |
| 5,478,520 A | 12/1995 | Kasai et al. | |
| 5,518,389 A | 5/1996 | Nonomura et al. | |
| 5,716,561 A | 2/1998 | Guergov | |
| 5,728,329 A | 3/1998 | Guergov | |
| 5,853,630 A | 12/1998 | Hettinga | |
| 5,902,525 A | 5/1999 | Hettinga | |
| 5,935,505 A | 8/1999 | Whetten et al. | |
| 5,939,004 A * | 8/1999 | Harrison | 264/251 |
| 6,090,318 A | 7/2000 | Bader et al. | |
| 6,276,656 B1 | 8/2001 | Baresich | |
| 6,290,882 B1 | 9/2001 | Maus et al. | |
| 6,372,162 B1 | 4/2002 | Szchech | |
| 6,464,909 B1 | 10/2002 | Kazmer et al. | |
| 6,616,871 B1 | 9/2003 | Iimura et al. | |
| 6,719,942 B1 | 4/2004 | Triplett et al. | |
| 6,824,379 B2 | 11/2004 | Doyle et al. | |
| 7,143,814 B1 | 12/2006 | James | |
| 7,168,942 B1 * | 1/2007 | Wieder | 425/552 |
| 7,419,625 B2 | 9/2008 | Vasapoli et al. | |
| 7,621,739 B2 | 11/2009 | Tilton et al. | |
| 7,785,090 B2 | 8/2010 | Amano et al. | |
| 7,794,643 B2 | 9/2010 | Watanabe et al. | |
| 7,910,029 B2 | 3/2011 | Koumaro | |
| 7,963,761 B2 * | 6/2011 | Oh et al. | 425/547 |
| 8,235,694 B2 | 8/2012 | Nam | |
| 8,235,697 B2 | 8/2012 | Olin et al. | |
| 8,591,219 B1 * | 11/2013 | Neufarth | B29C 33/046 425/547 |
| 9,089,998 B2 * | 7/2015 | Altonen | B29C 33/02 |
| 2001/0013672 A1 | 8/2001 | Kawamura et al. | |
| 2006/0165837 A1 | 7/2006 | Wood | |
| 2007/0108668 A1 | 5/2007 | Hutchinson et al. | |
| 2007/0184148 A1 | 8/2007 | Toyooka et al. | |
| 2008/0003323 A1* | 1/2008 | Manuel | B29C 33/04 425/470 |
| 2008/0064805 A1 | 3/2008 | Uosaki et al. | |
| 2008/0143006 A1 | 6/2008 | Honma et al. | |
| 2008/0197537 A1 | 8/2008 | Stemke | |
| 2009/0020924 A1 | 1/2009 | Lin | |
| 2009/0174101 A1 | 7/2009 | Johnson | |
| 2011/0005729 A1 | 1/2011 | Stemke | |
| 2011/0232856 A1 | 9/2011 | James | |
| 2012/0035327 A1 | 2/2012 | Ciarafoni et al. | |
| 2012/0291885 A1 | 11/2012 | Altonen et al. | |
| 2012/0292823 A1 | 11/2012 | Altonen et al. | |
| 2012/0294963 A1 | 11/2012 | Altonen et al. | |
| 2012/0295049 A1 | 11/2012 | Altonen et al. | |
| 2012/0295050 A1 | 11/2012 | Altonen et al. |
| 2012/0328724 A1 | 12/2012 | Altonen et al. |
| 2012/0329948 A1 | 12/2012 | Altonen et al. |
| 2013/0069280 A1 | 3/2013 | Altonen et al. |
| 2013/0113131 A1 | 5/2013 | Altonen et al. |
| 2013/0221572 A1 | 8/2013 | Berg, Jr. et al. |
| 2013/0221575 A1 | 8/2013 | Altonen et al. |
| 2013/0224327 A1 | 8/2013 | Altonen et al. |
| 2013/0295219 A1 | 11/2013 | Neufarth et al. |
| 2013/0295220 A1 | 11/2013 | Neufarth et al. |

FOREIGN PATENT DOCUMENTS

| | | |
|---|---|---|
| DE | 102009046835 A1 | 5/2011 |
| GB | 2164895 A | 4/1986 |
| JP | 60127125 | 7/1985 |
| JP | 0222026 A | 3/1990 |
| JP | 2098417 A | 4/1990 |
| JP | 3079317 A | 4/1991 |
| JP | 4126214 A | 4/1992 |
| JP | 5006914 A | 1/1993 |
| JP | 05077244 | 3/1993 |
| JP | 7223242 A | 8/1995 |
| JP | 11262936 | 9/1999 |
| JP | 2000202863 A | 7/2000 |
| JP | 2000280276 A | 10/2000 |
| JP | 2003001378 A | 1/2003 |
| JP | 2005215497 | 8/2005 |
| WO | 99/39889 * | 8/1999 |

OTHER PUBLICATIONS

The Engineering Tool Box, Thermal Conductivity of Metals, http://www.engineeringtoolbox.com/thermal-conductivity-metals-d_858.html, 2 pages, May 8, 2006.*

Barry James, "Evaporative Cooling Approach to Mold Temperature Control", article from MoldMaking Technology, posted on web Dec. 1, 2006, website http://www.moldmakingtechnology.com/articles/evaporative-cooling-approach-to-mold-temperature-control.

Richard Abbott et al., "Elimination Process Constraints in Plastics Injection Molding", ThermoCeramiX Inc., Shirley, Massachusetts, , Department of Plastics Engineering, University of Massachusetts Lowell, 8 pages.

BASF article from www.plasticsportal.com/usa, 6 pages.

Schnerr-Haeselbarth O:"Der Heisse Draht Ins Werkzeug Werkseuginnendruck-Basierte Systeme Steigern Die Produktivitat Und Senken Die Kosten", Kunstoffe International, Carl Hanser Verlag, Munchen DE, vol. 92, No. 7, Jul. 1, 2002, pp. 56-60.

Wikipedia: "Low Pressure Molding", pp. 1-4, XP002681936, Internet: http://en.wikipedia.org/wiki/Low_pressure_molding.

Homes W et al: "Spritzgiessprozesse In Echtzeit Regeln Eine Neue Technik Zur Aktiven Angussbalancierung", Kunstoffe International. Carl Hanser Verlag, Munchen DE, vol. 91, No. 1, Jan. 1, 2001, pp. 68-70.

Suh et al., "Structure Development of Various Polyolefins in Injection Molding", Antec 2006, Society of Plastics Engineers, 2006, pp. 760-765.

International Search Report, U.S. Appl. No. 13/476,045, dated Aug. 17, 2012, 14 pages.

International Search Report, U.S. Appl. No. 13/476,045, dated Aug. 16, 2012, 12 pages.

International Search Report, U.S. Appl. No. 13/476,073, dated Sep. 3, 2012, 16 pages.

International Search Report, U.S. Appl. No. 13/476,197, dated Aug. 16, 2012, 11 pages.

International Search Report, U.S. Appl. No. 13/476,178, dated Aug. 17, 2012, 13 pages.

International Search Report, U.S. Appl. No. 13/476,584, dated Aug. 17, 2012, 13 pages.

Alcoa:"QC-10 The aluminum mold alloy that out-machines, out-cools, out-produces and outsmarts steel", brochure dated 2010, 12 pages, Alcoa Forgings and Extrusions, 1600 Harvard Avenue, Cleveland, Ohio 44105, www.alcoa.com.

(56) References Cited

OTHER PUBLICATIONS

"Specialized Aluminum Products for Tool and Mold Applications", May/Jun. 2003 issue of Aluminum Now journal of the Aluminum Association, Inc., 4 pages.
AMPCO Metal, "Ampcoloy® 944: A new copper-silicon-chromium alloy for the Moldmaking Industry", brochure, 2 pages, www.ampcometal.com.
AMPCO Metal, "Ampcoloy® 944", brochure, 2 pages, www.ampcometal.com.
Clinton Aluminum & Stainless Steel, "Why aluminum mold?" presentation, Oct. 30, 2006, 20 pages, toll free # 800-826-3370.
European Tool & Mould Making ETMM, "High strength, hardness, thermal conductivity characterize copper mould making alloy", online article Dec. 9, 2011, 2 pages, http://www.etmm-online.com/materials/articles/353445/.
AMPCO Metal Inc., "Procurable Alloys", online article Nov. 2011, 5 pages, http://www.modernmetals.com/item/10715-procurable-alloys.html.
Sherry Baranek, "The Realities of Aluminum Tooling", article from Moldmaking Technology magazine dated Dec. 1, 2008, 4 pages, http://www.moldmakingtechnology.com/articles/the-realities-of-aluminum-tooling.
David Bank, "Choosing the Right Aluminum Alloy for Production Injection Molds", article from Moldmaking Technology magazine dated Jun. 1, 2007, 4 pages, http://www.moldmakingtechnology.com/articles/choosing-the-right-aluminum-alloy-for-production-injection-molds.
United States Patent and Trademark Office, online Trademark Electronic Search System, Moldmax HH, 2 pages, http://tess2.uspto.gov/bin/showfield?f=doc&state=4808:k8aqoi.3.8.
Rhoda Miel, "Aluminating Tooling", PlasticsNews.com online article Apr. 27, 2009, 2 pages, http://www.plasticsnews.com/article/20090427/NEWS/304279985/aluminating-tooling.
Joseph Pryweller, "Aluminum Injection Mold", online article from PlasticsNews.com, Jan. 13, 2003, 2 pages, http://aluminuminjectionmold.com/articles.html.
David Bank et al., "Why Plastic Flows Better in Aluminum Injection Molds", plastics technology article Sep. 2008, 8 pages.
Plastics Today, "Aluminum molds or steel? In the test, Al is the clear winner", online article Jan. 31, 2011, 2 pages, http://www.plasticstoday.com/articles/aluminum-molds-or-steel-test-aluminum-clear-winner.
A L Kelly, et al, "The effect of copper alloy mold tooling on the performance of the injection molding process", online article from The Free Library, 10 pages, http://www.thefreelibrary.com/The+effect+of+copper+alloy+mold+tooling+on+the+performance.
United States Patent and Trademark Office, online Trademark Electronic Search System, QC 10, 2 pages, http://tess2.uspto.gov/bin/showfield?f=doc&state=4810:7di60m.2.1.
Thyssenkrupp Materials NA, "QC-10 Aluminum Mold Plate", brochure, 4 pages.
Uddeholm, "Moldmax HH", brochure, 8 pages, www.uddeholm.com.
Li et al., Automatic Layout Design of Plastic Injection Mould Cooling System, Computer-aided Design 37 (2005) 645-662.
International Search Report, U.S. Appl. No. 13/682,456, dated Aug. 2, 2013, 11 pages.
PCT International Search Report dated Jan. 3, 2014, 12 pages.

* cited by examiner

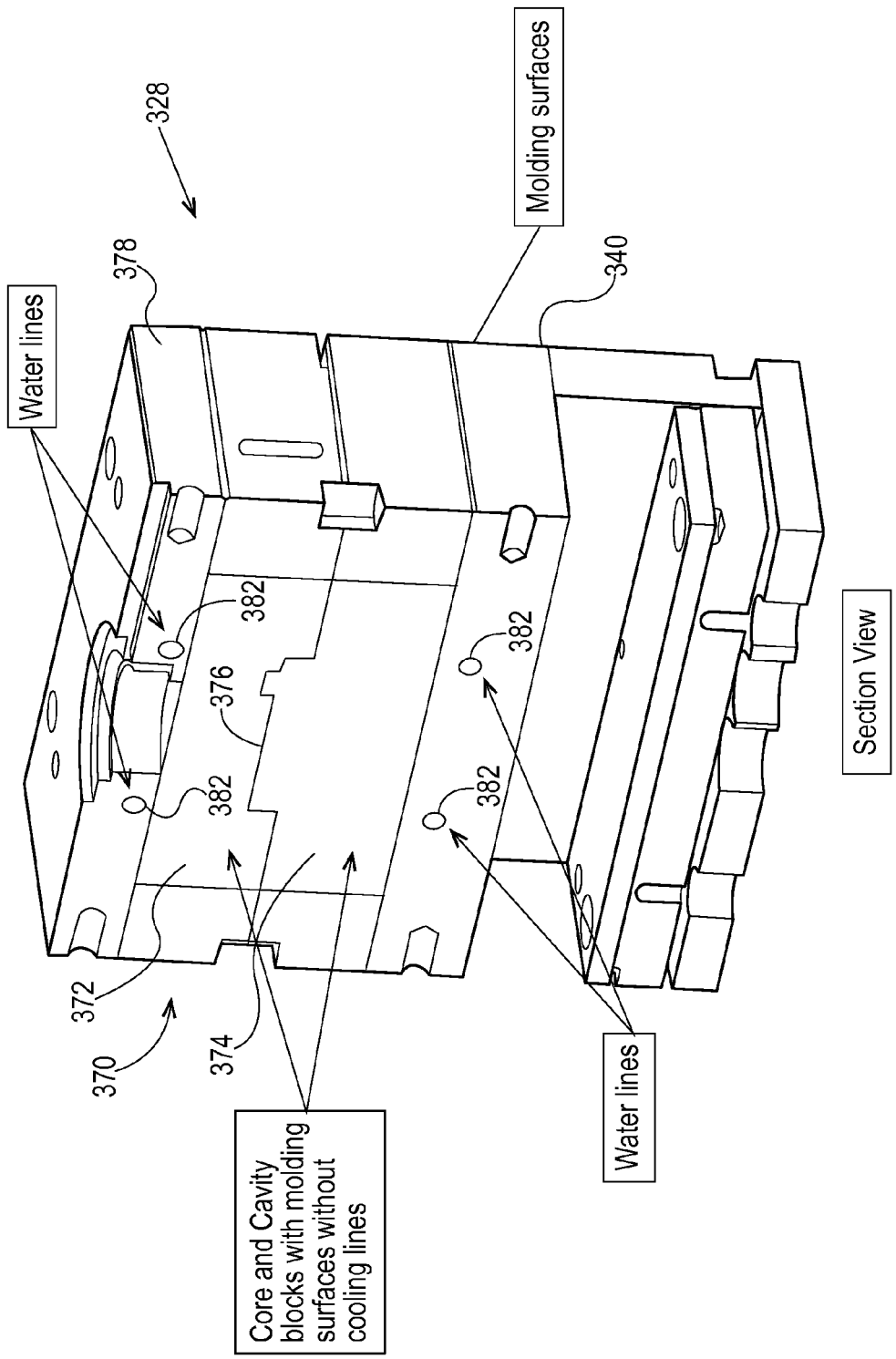

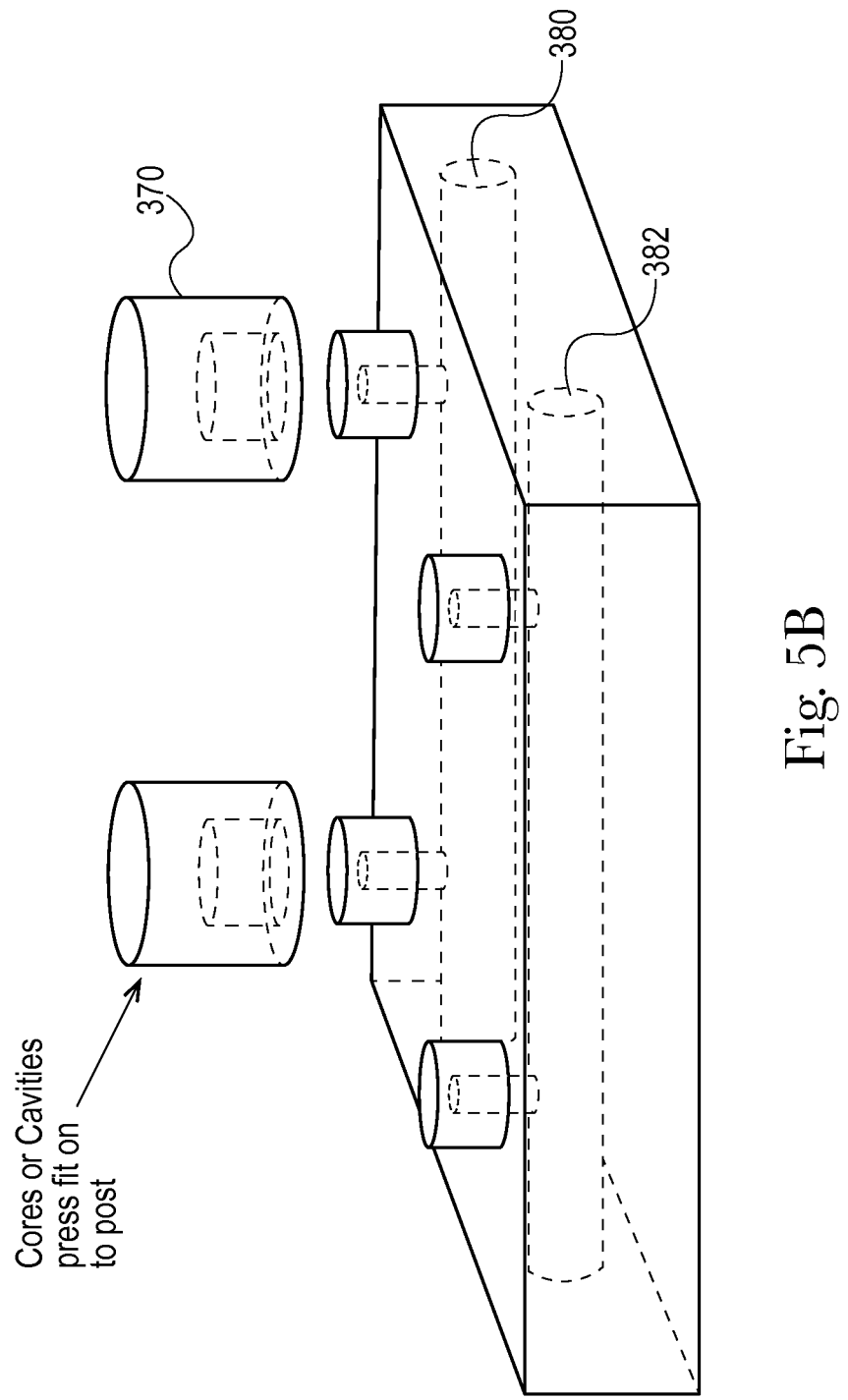

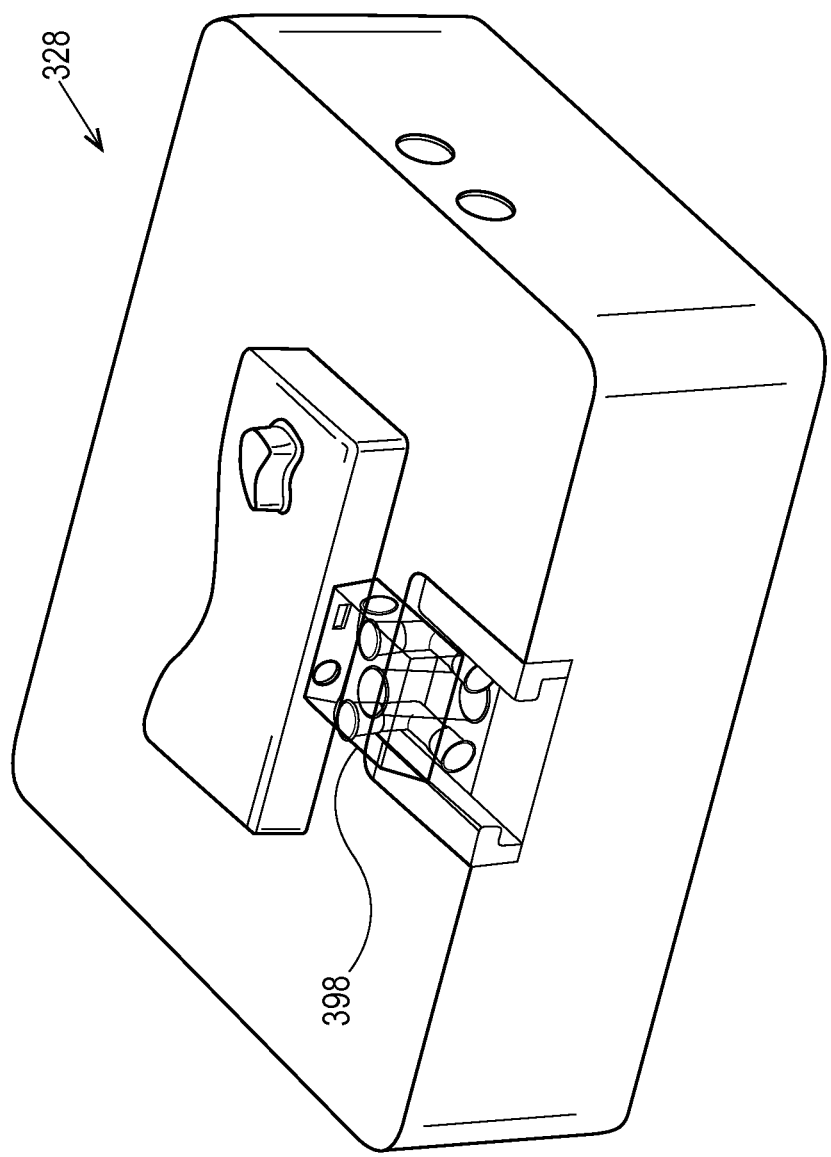

INJECTION MOLD HAVING A SIMPLIFIED EVAPORATIVE COOLING SYSTEM OR A SIMPLIFIED COOLING SYSTEM WITH EXOTIC COOLING FLUIDS

TECHNICAL FIELD

The present invention relates to injection molds, more particularly, to injection molds having a simplified evaporative cooling system.

BACKGROUND

Injection molding is a technology commonly used for high-volume manufacturing of parts made of meltable material, most commonly of parts made of thermoplastic polymers. During a repetitive injection molding process, a plastic resin, most often in the form of small beads or pellets, is introduced to an injection molding machine that melts the resin beads under heat, pressure, and shear. The now molten resin is forcefully injected into a mold cavity having a particular cavity shape. The injected plastic is held under pressure in the mold cavity, cooled, and then removed as a solidified part having a shape that essentially duplicates the cavity shape of the mold. The mold itself may have a single cavity or multiple cavities. Each cavity may be connected to a flow channel by a gate, which directs the flow of the molten resin into the cavity. Thus, a typical injection molding procedure comprises four basic operations: (1) heating the plastic in the injection molding machine to allow it to flow under pressure; (2) injecting the melted plastic into a mold cavity or cavities defined between two mold halves that have been closed; (3) allowing the plastic to cool and harden in the cavity or cavities while under pressure; and (4) opening the mold halves to allow the part to be ejected from the mold.

The molten plastic resin is injected into the mold cavity and the plastic resin is forcibly pushed through the cavity by the injection molding machine until the plastic resin reaches the location in the cavity furthest from the gate. The resulting length and wall thickness of the part is a result of the shape of the mold cavity.

The molds used in injection molding machines must be capable of withstanding these high melt pressures. Moreover, the material forming the mold must have a fatigue limit that can withstand the maximum cyclic stress for the total number of cycles a mold is expected to run over the course of its lifetime. As a result, mold manufacturers typically form the mold from materials having high hardness, such as tool steels, having greater than 30 Rc, and more often greater than 50 Rc. These high hardness materials are durable and equipped to withstand the high clamping pressures required to keep mold components pressed against one another during the plastic injection process. Additionally, these high hardness materials are better able to resist wear from the repeated contact between molding surfaces and polymer flow.

High production injection molding machines (i.e., class 101 and class 102 molding machines) that produce thin-walled consumer products exclusively use molds having a majority of the mold made from the high hardness materials. High production injection molding machines typically produce 500,000 parts or more. Industrial quality production molds must be designed to produce at least 500,000 parts, preferably more than 1,000,000 parts, more preferably more than 5,000,000 parts, and even more preferably more than 10,000,000 parts. These high production injection molding machines have multi cavity molds and complex cooling systems to increase production rates. The high hardness materials described above are more capable of withstanding the repeated high pressure clamping and injection operations than lower hardness materials. However, high hardness materials, such as most tool steels, have relatively low thermal conductivities, generally less than 20 BTU/HR FT ° F., which leads to long cooling times as heat is transferred from the molten plastic material through the high hardness material to a cooling fluid.

In an effort to reduce cycle times, typical high production injection molding machines having molds made of high hardness materials include relatively complex internal cooling systems that circulate cooling fluid within the mold. These cooling systems accelerate cooling of the molded parts, thus allowing the machine to complete more cycles in a given amount of time, which increases production rates and thus the total amount of molded parts produced. However, these cooling systems add complexity and cost to the injection molds. In some class 101 molds more than 1 or 2 million parts may be produced, these molds are sometimes referred to as "ultra high productivity molds" Class 101 molds that run in 400 ton or larger presses are sometimes referred to as "400 class" molds within the industry.

High hardness materials are generally fairly difficult to machine. As a result, known high throughput injection molds require extensive machining time and expensive machining equipment to form, and expensive and time consuming post-machining steps to relieve stresses and optimize material hardness. Milling and/or forming cooling channels within these complex molds adds even more time and costs to the manufacture of typical high throughput injection molds.

There is a tradeoff between machining complexity and cooling efficiency in traditional, high hardness molds. Ideally, cooling channels should be machined as close to the mold cavity surfaces as possible. Additionally, conformal cooling is desirable and most effective. However, machining conformal cooling channels close to molding surfaces is difficult, time consuming, and expensive. Generally, machining cooling channels within about 5 mm of the mold surfaces is considered to be the practical limit. This practical limit reduces cooling efficiency due to material between the cooling fluid and the hot plastic having low thermal conductivity. Conventional machining techniques, along with conventional mold materials (i.e., high hardness and low thermal conductivity) place a lower limit on cycle time and cooling efficiency for a given mold.

Furthermore, locating cooling lines close to the mold surfaces requires precise machining of the cooling lines in the molds. Because the molds are supported by mold support plates when placed in a clamping device of the injection molding machine, fluid seals must be located where the cooling lines transition from the mold support plate to the mold (because the fluid circulating systems (e.g., pumps) must be located outside of the molds). These fluid seals may fail, causing cooling fluid to escape. As a result, parts may be incompletely cooled, which produces an inferior part, or the plastic in the mold may be contaminated with cooling fluid, which is also undesirable.

Still further, practical limitations on machining cooling channels results in unequal cooling within the mold. As a result, temperature gradients are produced within the mold cavity. Often the temperature of the surface of a mold cavity can vary by ten degrees Celsius or more. This wide variation in temperature within the mold can lead to imperfections in the molded parts.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 5A-5E illustrate different views of various mold assemblies having a plurality of cooling lines machined in a mold support plate;

FIG. 11 illustrates a perspective view of a mold assembly having an actively cooled dynamic part;

DETAILED DESCRIPTION

Embodiments of the present invention generally relate to systems, machines, products, and methods of producing products by injection molding and more specifically to systems, products, and methods of producing products by low constant pressure injection molding.

The term "low pressure" as used herein with respect to melt pressure of a thermoplastic material, means melt pressures in a vicinity of a nozzle of an injection molding machine of 6000 psi and lower.

The term "substantially constant pressure" as used herein with respect to a melt pressure of a thermoplastic material, means that deviations from a baseline melt pressure do not produce meaningful changes in physical properties of the thermoplastic material. For example, "substantially constant pressure" includes, but is not limited to, pressure variations for which viscosity of the melted thermoplastic material do not meaningfully change. The term "substantially constant" in this respect includes deviations of approximately 30% from a baseline melt pressure. For example, the term "a substantially constant pressure of approximately 4600 psi" includes pressure fluctuations within the range of about 6000 psi (30% above 4600 psi) to about 3200 psi (30% below 4600 psi). A melt pressure is considered substantially constant as long as the melt pressure fluctuates no more than 30% from the recited pressure.

Figure 1:
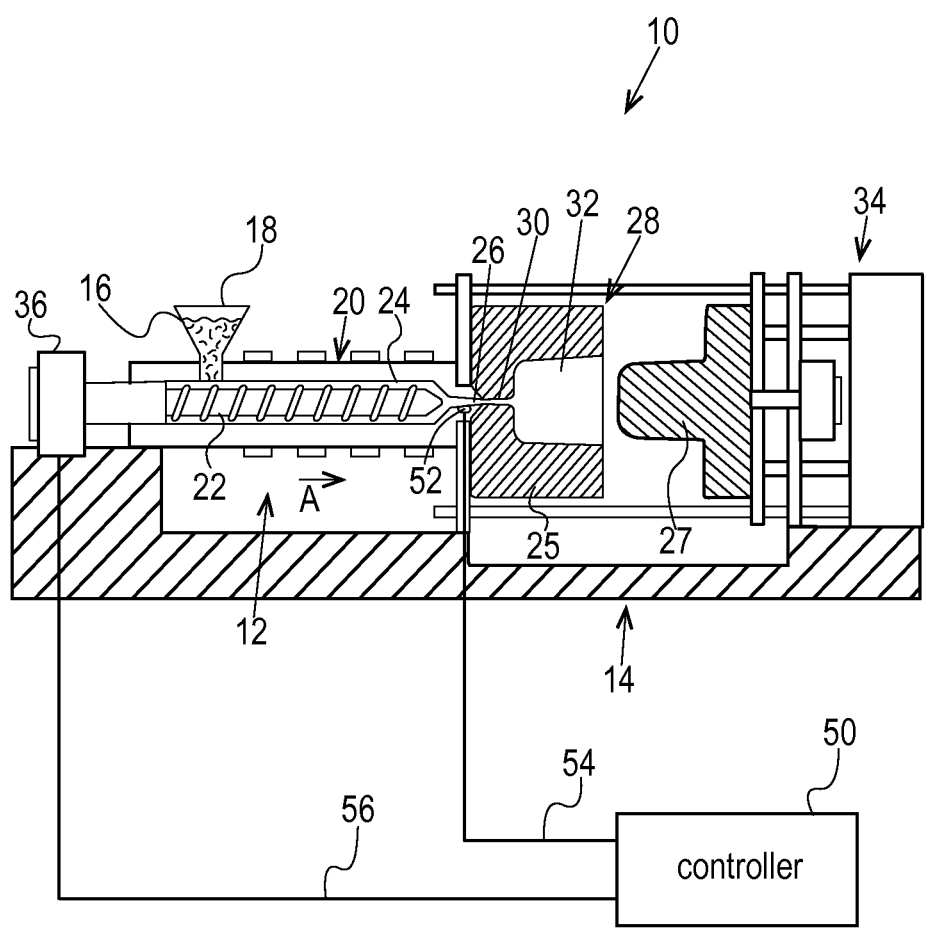
FIG. 1 illustrates a schematic view of an injection molding machine constructed according to the disclosure.

Referring to the figures in detail, FIG. 1 illustrates an exemplary low constant pressure injection molding apparatus 10 for producing thin-walled parts in high volumes (e.g., a class 101 or 102 injection mold, or an "ultra high productivity mold"). The injection molding apparatus 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24, toward a nozzle 26 to form a shot of thermoplastic material, which will be injected into a mold cavity 32 of a mold 28. The molten thermoplastic material 24 may be injected through a gate 30, which directs the flow of the molten thermoplastic material 24 to the mold cavity 32. The mold cavity 32 is formed between first and second mold parts 25, 27 of the mold 28 and the first and second mold parts 25, 27 are held together under pressure by a press or clamping unit 34. The press or clamping unit 34 applies a clamping force in the range of approximately 1000 psi to approximately 6000 psi during the molding process to hold the first and second mold parts 25, 27 together while the molten thermoplastic material 24 is injected into the mold cavity 32. To support these clamping forces, the clamping system 14 may include a mold frame and a mold base, the mold frame and the mold base being formed from a material having a surface hardness of more than about 165 BHN and preferably less than 260 BHN, although materials having surface hardness BHN values of greater than 260 may be used as long as the material is easily machineable, as discussed further below.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold parts 25, 27, the first and second mold parts 25, 27 are separated from one another, and the finished part may be ejected from the mold 28. The mold 28 may include a plurality of mold cavities 32 to increase overall production rates.

A controller 50 is communicatively connected with a sensor 52 and a screw control 36. The controller 50 may include a microprocessor, a memory, and one or more communication links. The controller 50 may be connected to the sensor 52 and the screw control 36 via wired connections 54, 56, respectively. In other embodiments, the controller 50 may be connected to the sensor 52 and screw control 56 via a wireless connection, a mechanical connection, a hydraulic connection, a pneumatic connection, or any other type of communication connection known to those having ordinary skill in the art that will allow the controller 50 to communicate with both the sensor 52 and the screw control 36.

In the embodiment of FIG. 1, the sensor 52 is a pressure sensor that measures (directly or indirectly) melt pressure of the molten thermoplastic material 24 in the nozzle 26. The sensor 52 generates an electrical signal that is transmitted to the controller 50. The controller 50 then commands the screw control 36 to advance the screw 22 at a rate that maintains a substantially constant melt pressure of the molten thermoplastic material 24 in the nozzle 26. While the sensor 52 may directly measure the melt pressure, the sensor 52 may measure other characteristics of the molten thermoplastic material 24, such as temperature, viscosity, flow rate, etc, that are indicative of melt pressure. Likewise, the sensor 52 need not be located directly in the nozzle 26, but rather the sensor 52 may be located at any location within the injection system 12 or mold 28 that is fluidly connected with the nozzle 26. If the sensor 52 is not located within the nozzle 26, appropriate correction factors may be applied to the measured characteristic to calculate the melt pressure in the nozzle 26. In yet other embodiments, the sensor 52 need not be fluidly connected with the nozzle. Rather, the sensor could measure clamping force generated by the clamping system 14 at a mold parting line between the first and second mold parts 25, 27.

Although an active, closed loop controller 50 is illustrated in FIG. 1, other pressure regulating devices may be used instead of the closed loop controller 50. For example, a pressure regulating valve (not shown) or a pressure relief valve (not shown) may replace the controller 50 to regulate the melt pressure of the molten thermoplastic material 24. More specifically, the pressure regulating valve and pressure relief valve can prevent overpressurization of the mold 28. Another alternative mechanism for preventing overpressurization of the mold 28 is an alarm that is activated when an overpressurization condition is detected.

Figure 2:
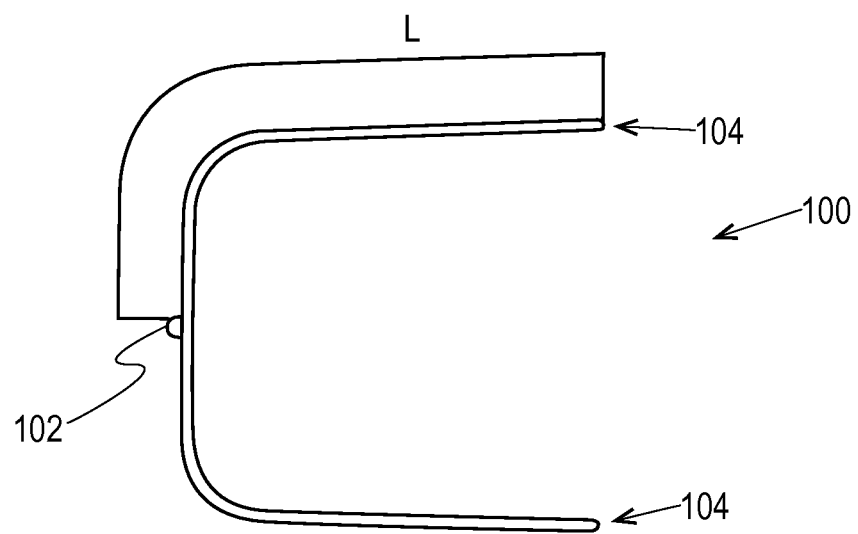
FIG. 2 illustrates one embodiment of a thin-walled part formed in the injection molding machine of FIG. 1.

Turning now to FIG. 2, an example molded part 100 is illustrated. The molded part 100 is a thin-walled part. Molded parts are generally considered to be thin-walled when a length of a flow channel L divided by a thickness of the flow channel T is greater than 100 (i.e., L/T>100). The low constant pressure injection molding systems and molds having simplified cooling that are described herein become increasingly advantageous for molding parts as L/T ratios increase, particularly for parts having L/T>200, or L/T>250 because the molten thermoplastic material includes a continuous flow front that advances through the mold cavity, which fills the mold cavity with thermoplastic material more consistently than high variable pressure injection molding systems. The length of the flow channel L is measured from a gate 102 to a flow channel end 104. Thin-walled parts are especially prevalent in the consumer products industry and healthcare or medical supplies industry.

Thin-walled parts present certain obstacles in injection molding. For example, the thinness of the flow channel tends to cool the molten thermoplastic material before the material reaches the flow channel end 104. When this happens, the thermoplastic material freezes off and no longer flows, which results in an incomplete part. To overcome this problem, traditional injection molding machines inject the molten thermoplastic material into the mold at very high pressures, typically greater than 15,000 psi, so that the molten thermoplastic material rapidly fills the mold cavity before having a chance to cool and freeze off. This is one reason that manufacturers of the thermoplastic materials teach injecting at very high pressures. Another reason traditional injection molding machines inject molten plastic into the mold at high pressures is the increased shear, which increases flow characteristics, as discussed above. These very high injection pressures require the use of very hard materials to form the mold 28 and the feed system.

Traditional injection molding machines use molds made of tool steels or other hard materials to make the mold. While these tool steels are robust enough to withstand the very high injection pressures, tool steels are relatively poor thermal conductors. As a result, very complex cooling systems are machined into the molds to enhance cooling times when the mold cavity is filled, which reduces cycle times and increases productivity of the mold. However, these very complex cooling systems add great time and expense to the mold making process.

The inventors have discovered that shear-thinning thermoplastics (even minimally shear-thinning thermoplastics) may be injected into the mold 28 at low, substantially constant, pressure without any significant adverse affects. Examples of these materials include but are not limited to polymers and copolymers comprised of, polyolefins (e.g., polypropylene, polyethylene), thermoplastic elastomers, polyesters (e.g. polyethelyne terephthalate, polybutelene terephthalate), polystyrene, polycarbonate, poly(acrylonitrile-butadiene-styrene), poly(latic acid), polyhydroxyalkanoate, polyamides, polyacetals, ethylene-alpha olefin rubbers, and styrene-butadiene-stryene block copolymers. In fact, parts molded at low, substantially constant, pressures exhibit some superior properties as compared to the same part molded at a conventional high pressure. This discovery directly contradicts conventional wisdom within the industry that teaches higher injection pressures are better. Without being bound by theory, it is believed that injecting the molten thermoplastic material into the mold 28 at low, substantially constant, pressures creates a continuous flow front of thermoplastic material that advances through the mold from a gate to a farthest part of the mold cavity. By maintaining a low level of shear, the thermoplastic material remains liquid and flowable at much lower temperatures and pressures than is otherwise believed to be possible in conventional high pressure injection molding systems.

Figure 3:
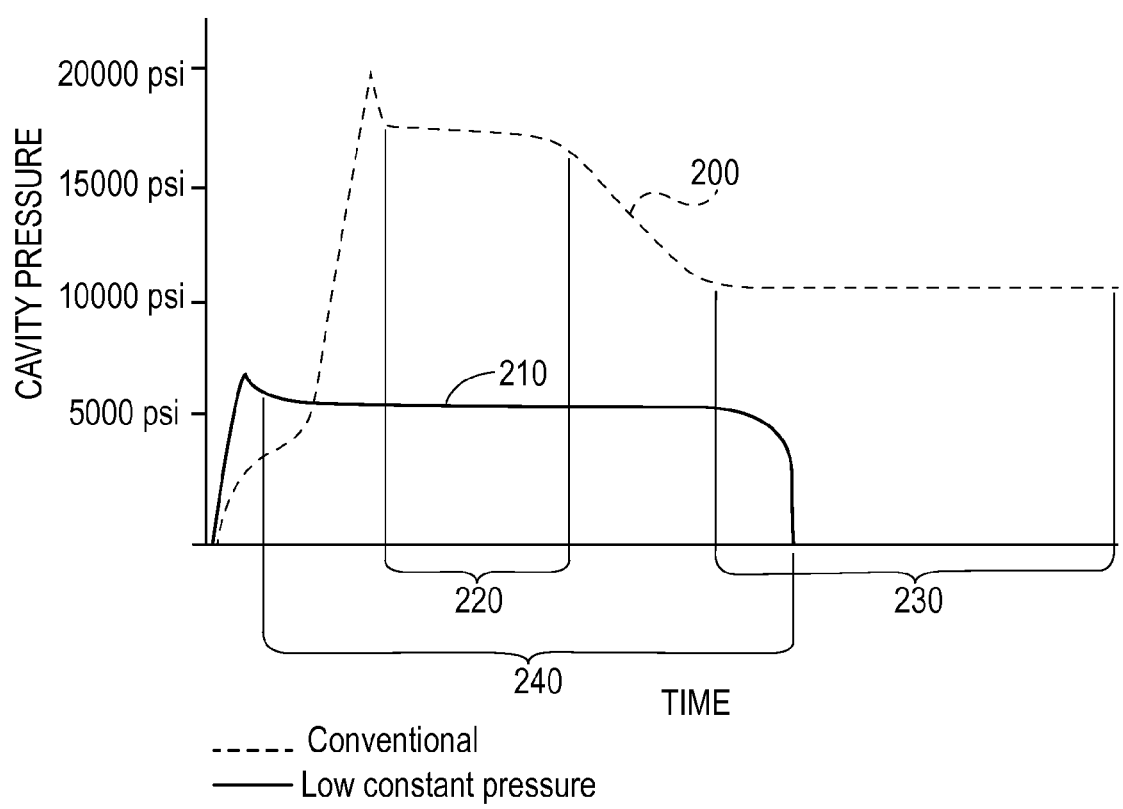
FIG. 3 is a cavity pressure vs. time graph for a mold cavity in a mold of the injection molding machine of FIG. 1.

Turning now to FIG. 3, a typical pressure-time curve for a conventional high pressure injection molding process is illustrated by the dashed line 200. By contrast, a pressure-time curve for the disclosed low constant pressure injection molding machine is illustrated by the solid line 210.

In the conventional case, melt pressure is rapidly increased to well over 15,000 psi and then held at a relatively high pressure, more than 15,000 psi, for a first period of time 220. The first period of time 220 is the fill time in which molten plastic material flows into the mold cavity. Thereafter, the melt pressure is decreased and held at a lower, but still relatively high pressure, 10,000 psi or more, for a second period of time 230. The second period of time 230 is a packing time in which the melt pressure is maintained to ensure that all gaps in the mold cavity are back filled. The mold cavity in a conventional high pressure injection molding system is filled from the end of the flow channel back to towards the gate. As a result, plastic in various stages of solidification are packed upon one another, which may cause inconsistencies in the finished product, as discussed above. Moreover, the conventional packing of plastic in various stages of solidification results in some non-ideal material properties, for example, molded-in stresses, sink, and non-optimal optical properties.

The constant low pressure injection molding system, on the other hand, injects the molten plastic material into the mold cavity at a substantially constant low pressure for a single time period 240. The injection pressure is less than 6,000 psi. By using a substantially constant low pressure, the molten thermoplastic material maintains a continuous melt front that advances through the flow channel from the gate towards the end of the flow channel. Thus, the plastic material remains relatively uniform at any point along the flow channel, which results in a more uniform and consistent finished product. By filling the mold with a relatively uniform plastic material, the finished molded parts may form crystalline structures that have better mechanical and/or better optical properties than conventionally molded parts. Amorphous polymers may also form structures having superior mechanical and/or optical properties. Moreover, the skin layers of parts molded at low constant pressures exhibit different characteristics than skin layers of conventionally molded parts. As a result, the skin layers of parts molded under low constant pressure can have better optical properties than skin layers of conventionally molded parts.

By maintaining a substantially constant and low (e.g., less than 6000 psi) melt pressure within the nozzle, more machineable materials may be used to form the mold 28. For example, the mold 28 illustrated in FIG. 1 may be formed of a material having a milling machining index of greater than 100%, a drilling machining index of greater than 100%, a wire EDM machining index of greater than 100%, a graphite sinker EDM machining index of greater than 200%, or a copper sinker EDM machining index of greater than 150%. The machining indexes are based upon milling, drilling, wire EDM, and sinker EDM tests of various materials. The test methods for determining the machining indices are explained in more detail below. Examples of machining indexes for a sample of materials is compiled below in Table 1.

TABLE 1

| | | Machining Technology | | | | | | | | | |
|---|---|---|---|---|---|---|---|---|---|---|---|
| | | Milling | | Drilling | | Wire EDM | | Sinker EDM-Graphite | | Sinker EDM-Copper | |
| | | Spindle Load | Index % | Spindle Load | Index % | time | Index % | time | Index % | time | Index % |
| Material | 1117 steel* | 0.72 | 100% | 0.32 | 100% | 9:34 | 100% | 0:14:48 | 100% | 0:24:00 | 100% |
| | 6061 Aluminum alloy | 0.5 | 144% | 0.2 | 160% | 4:46 | 201% | 0:05:58 | 248% | 0:15:36 | 154% |
| | 7075 Aluminum alloy | 0.55 | 131% | 0.24 | 133% | 4:48 | 199% | 0:05:20 | 278% | 0:12:27 | 193% |
| | QC-10 a Aluminum alloy | 0.56 | 129% | 0.24 | 133% | 4:47 | 200% | 0:05:11 | 286% | 0:12:21 | 194% |
| | 41-40 Steel | 0.92 | 78% | 0.37 | 86% | 9:28 | 101% | 0:09:36 | 154% | 0:19:20 | 124% |
| | 420 stainless steel | 1.36 | 53% | 0.39 | 82% | 8:30 | 113% | 0:10:12 | 145% | 0:23:20 | 103% |
| | A2 AISI tool steel | 0.97 | 74% | 0.45 | 71% | 8:52 | 108% | 0:08:00 | 185% | 0:20:12 | 119% |
| | S7 AISI tool steel | 1.2 | 60% | 0.43 | 74% | 9:03 | 106% | 0:12:53 | 115% | 0:20:58 | 114% |
| | P20 AISI mold steel | 1.1 | 65% | 0.38 | 84% | 9:26 | 101% | 0:11:47 | 126% | 0:20:30 | 117% |
| | PX5 AISI mold steel | 1.12 | 64% | 0.37 | 86% | 9:22 | 102% | 0:12:37 | 117% | 0:23:18 | 103% |
| | MOLDMAX b HH Beryllium copper mold alloy | 0.8 | 90% | 0.36 | 89% | 6:00 | 159% | 6:59:35 | 4% 1 | 0:43:38 | 55% 3 |

TABLE 1-continued

| | | Machining Technology | | | | | | | | | |
|---|---|---|---|---|---|---|---|---|---|---|---|
| | | Milling | | Drilling | | Wire EDM | | Sinker EDM-Graphite | | Sinker EDM-Copper | |
| | | Spindle Load | Index % | Spindle Load | Index % | time | Index % | time | Index % | | time | Index % | |
| AMPCOLOY 944 steel alloy | c | 0.62 | 116% | 0.32 | 100% | 6:53 | 139% | 3:13:41 | 8% | 2 | 0:30:21 | 79% | 4 | a—QC-10 available from Alcoa, Inc. of Pittsburgh, Pennsylvania, United States
b—MOLDMAX HH available from Brush Wellman, Inc. of Mayfield Heights, Ohio, United States
c—AMPCOLOY 944 available from Ampco Metal, SA of Marly, Switzerland
*1117 is the benchmark material for this test. Published data references 1212 carbonsteel as the benchmark material. 1212 was not readily available. Of the published data, 1117 was the closest in composition and machining index percentage (91%).
1 Significant graphite electrode wear: ~20%
2 graphite electrode wear: ~15%
3 Cu electrode wear: ~15%
4 Cu electrode wear: ~3%

Using easily machineable materials to form the mold 28 results in greatly decreased manufacturing time and thus, a decrease in manufacturing costs. Moreover, these machineable materials generally have better thermal conductivity than tool steels, which increases cooling efficiency and decreases the need for complex cooling systems.

When forming the mold 28 of these easily machineable materials, it is also advantageous to select easily machineable materials having good thermal conductivity properties. Materials having thermal conductivities of more than 30 BTU/HR FT °F. are particularly advantageous. For example easily machineable materials having good thermal conductivities include, but are not limited to, QC-10 (an aluminum alloy available from Alcoa, Inc. of Pittsburgh, Pa., United States), DURAMOLD-5 (an aluminum alloy available from Vista Metals Corp. of Fontana, Calif., United States), and HOKOTOL (an aluminum alloy available from Aleris International, Inc. of Beachwood, Ohio, United States). Materials with good thermal conductivity more efficiently transmit heat from the thermoplastic material out of the mold. As a result, more simple cooling systems may be used.

Figure 4:
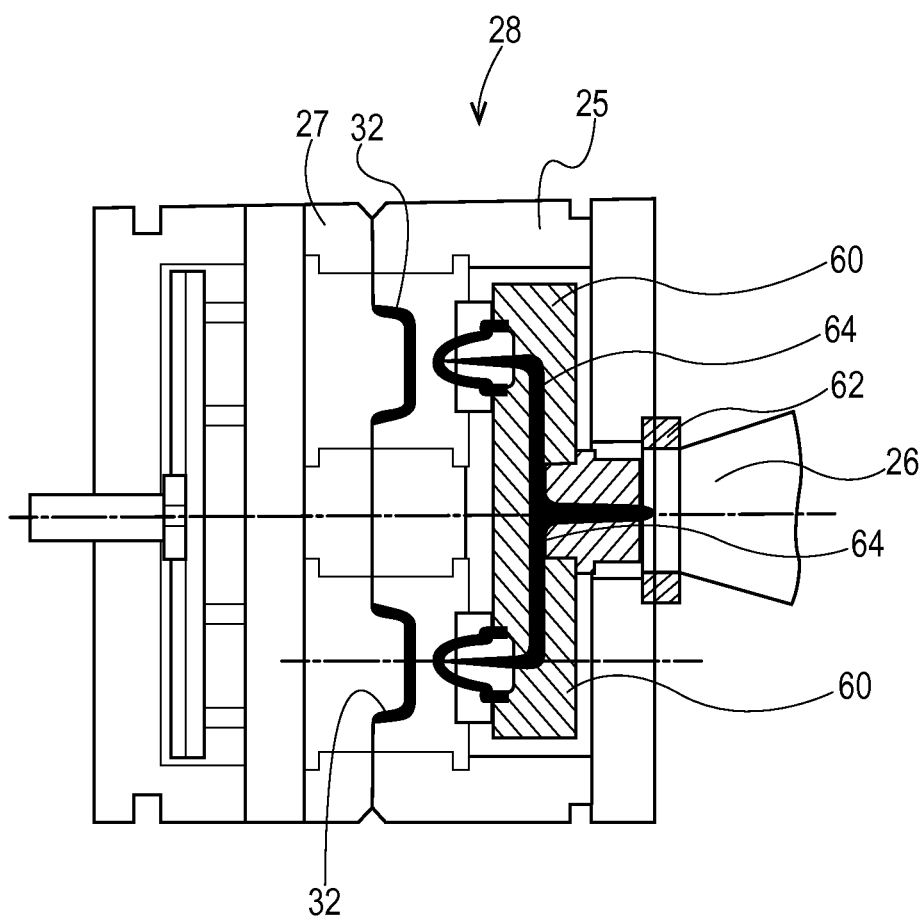
FIG. 4 is a cross-sectional view of one embodiment of a mold assembly of the injection molding machine of FIG. 1.
Figure 5C:
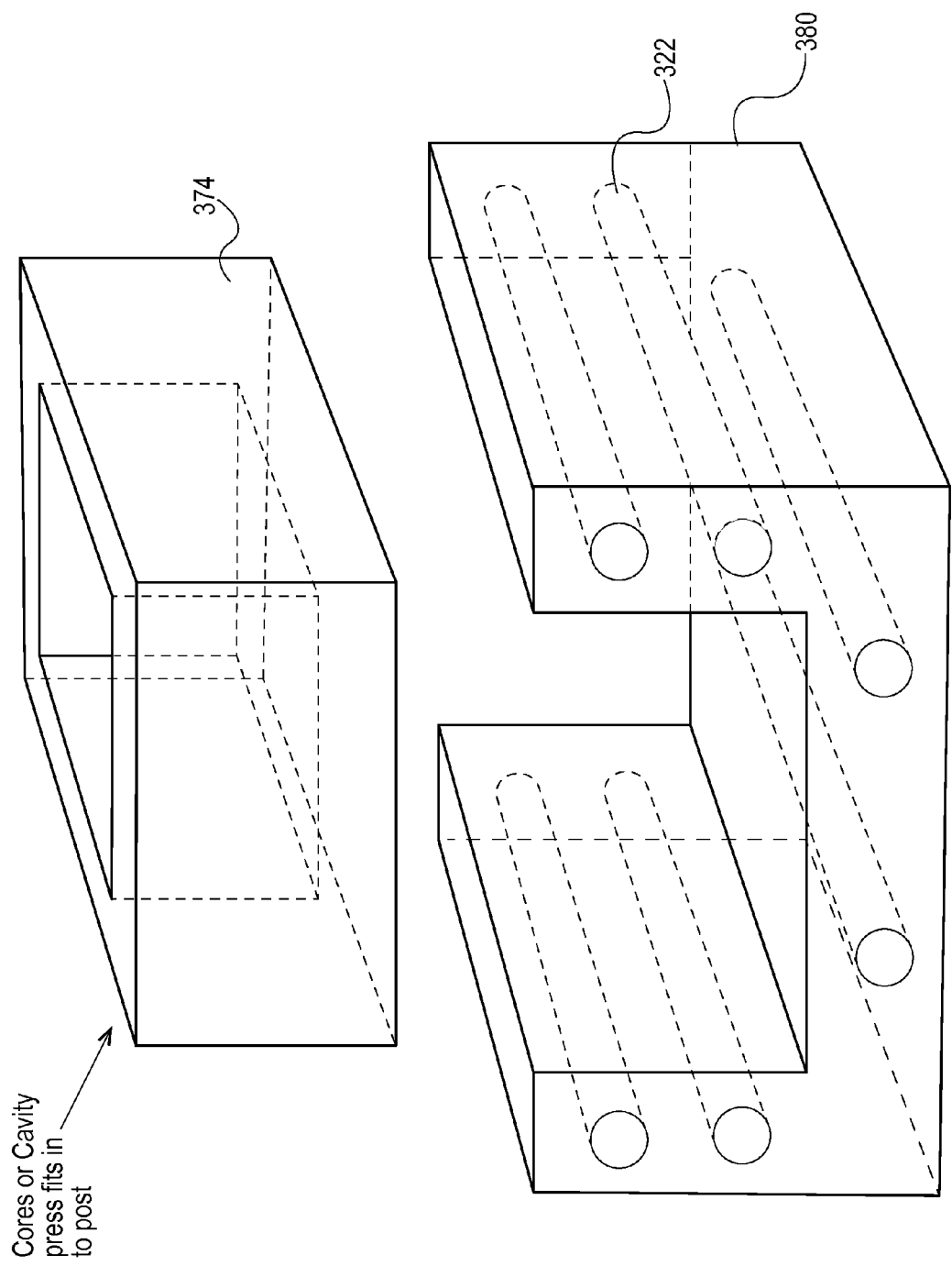
Figure 5D:
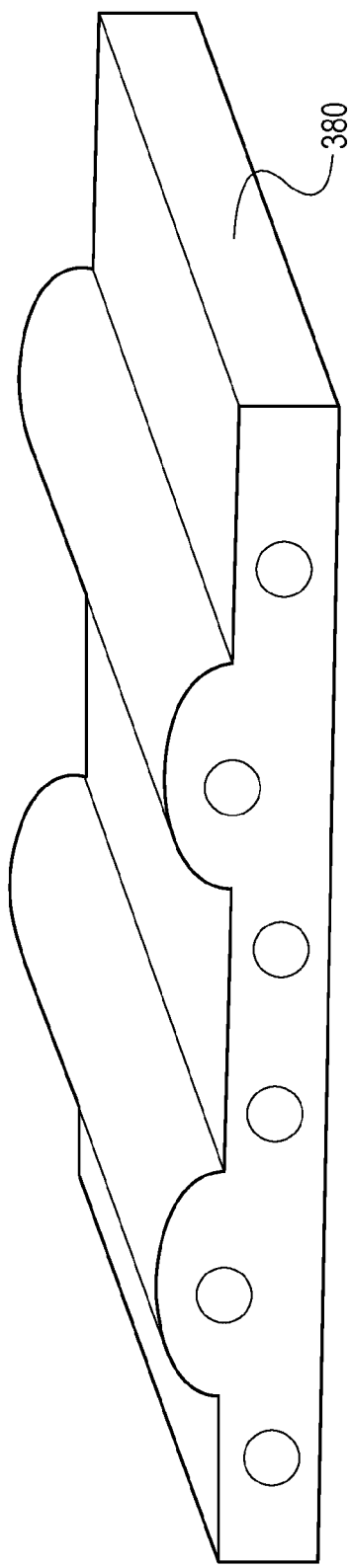
Figure 5E:
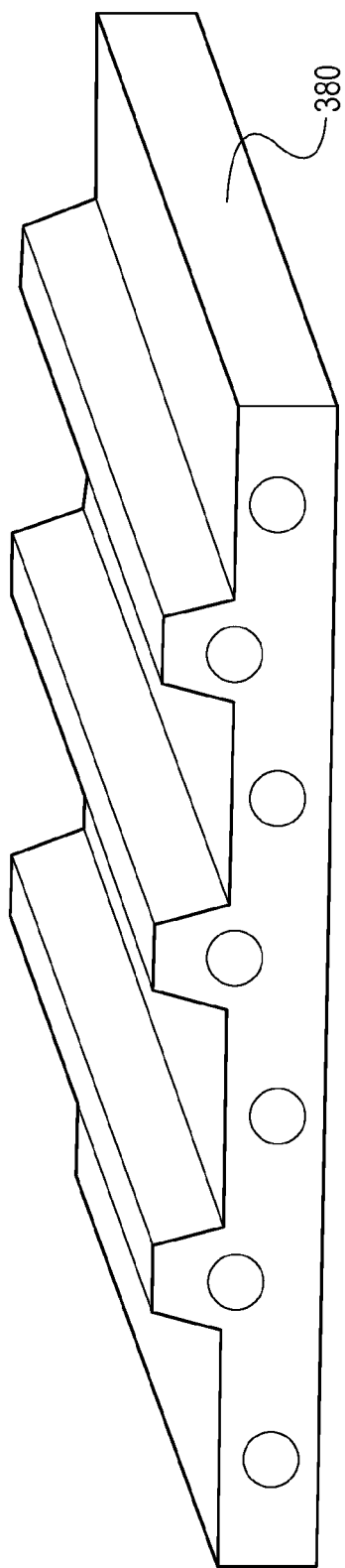

One example of a multi-cavity mold assembly 28 is illustrated in FIG. 4. Multi-cavity molds generally include a feed manifold 60 that directs molten thermoplastic material from the nozzle 26 to the individual mold cavities 32. The feed manifold 60 includes a sprue 62, which directs the molten thermoplastic material into one or more runners or feed channels 64. Each runner 64 may feed multiple mold cavities 32. High productivity molds may include four or more mold cavities 32, sometimes as many as three hundred and eighty four mold cavities 32, and often also may include heated runners 64. Some embodiments of constant low pressure injecting molding machines may include non-naturally balanced feed systems, such as artificially balanced feed systems, or non-balanced feed systems.

Drilling and Milling Machineability Index Test Methods

The drilling and milling machineability indices listed above in Table 1 were determined by testing the representative materials in carefully controlled test methods, which are described below.

The machineability index for each material was determined by measuring the spindle load needed to drill or mill a piece of the material with all other machine conditions (e.g., machine table feed rate, spindle rpm, etc.) being held constant between the various materials. Spindle load is reported as a ratio of the measured spindle load to the maximum spindle torque load of 75 ft-lb at 1400 rpm for the drilling or milling device. The index percentage was calculated as a ratio between the spindle load for 1117 steel to the spindle load for the test material.

The test milling or drilling machine was a Haas VF-3 Machining Center.

TABLE 2

| Drilling Conditions | |
|---|---|
| Spot Drill | 118 degree 0.5" diameter, drilled to 0.0693" depth |
| Drill Bit | 15/32" diameter high speed steel uncoated jobber length bit |
| Spindle Speed | 1200 rpm |
| Depth of Drill | 0.5" |
| Drill Rate | 3 in/min |
| Other | No chip break routine used |

TABLE 3

| Milling Conditions | |
|---|---|
| Mill | 0.5" diameter 4 flute carbide flat bottom end mill, uncoated (SGS part # 36432 www.sgstool.com) |
| Spindle Speed | 1200 rpm |
| Depth of Cut | 0.5" |
| Stock Feed Rate | 20 in/min |

For all tests "flood blast" cooling was used. The coolant was Koolrite 2290.

EDM Machineability Index Test Methods

The graphite and copper sinker EDM machineability indices listed above in Table 1 were determined by testing the representative materials in a carefully controlled test method, which is described below.

The EDM machineability index for the various materials were determined by measuring the time to burn an area (specifics below) into the various test metals. The machineability index percentage was calculated as the ratio of the time to burn into 1117 steel to time required to burn the same area into the other test materials.

TABLE 4

Wire EDM

| | |
|---|---|
| Equipment | Fanuc OB |
| Wire | 0.25 mm diameter hard brass |
| Cut | 1" thick × 1" length (1 sq.") |
| Parameters | Used Fanuc on board artificial intelligence, override at 100% |

TABLE 5

Sinker EDM - Graphite

| | |
|---|---|
| Equipment | Ingersoll Gantry 800 with Mitsubishi EX Controller |
| Wire | System 3R pre-mounted 25 mm diameter Poco EDM 3 graphite |
| Cut | 0.1" Z axis plunge |
| Parameters | Used Mitsubishi CNC controls with FAP EX Series Technology |

TABLE 6

Sinker EDM - Copper

| | |
|---|---|
| Equipment | Ingersoll Gantry 800 with Mitsubishi EX Controller |
| Wire | System 3R pre-mounted 25 mm diameter Tellurium Copper |
| Cut | 0.1" Z axis plunge |
| Parameters | Used Mitsubishi CNC controls with FAP EX Series Technology |

The disclosed low constant pressure injection molding machines advantageously employ molds constructed from easily machineable materials. As a result, the disclosed low constant pressure injection molds (and thus the disclosed low constant pressure injection molding machines) are less expensive and faster to produce. Additionally, the disclosed low constant pressure injection molding machines are capable of employing more flexible support structures and more adaptable delivery structures, such as wider platen widths, increased tie bar spacing, elimination of tie bars, lighter weight construction to facilitate faster movements, and non-naturally balanced feed systems. Thus, the disclosed low constant pressure injection molding machines may be modified to fit delivery needs and are more easily customizable for particular molded parts.

Moreover, the disclosed low constant pressure injection molds (e.g., mold assemblies that include one or more mold sides and one or more mold support plates) may include simplified cooling systems relative to cooling systems found in conventional high pressure injection molds. The simplified cooling systems are more economical than conventional cooling systems because the simplified cooling systems are more quickly and easily produced. Additionally, the simplified cooling systems use less coolant, which further reduces cooling costs during molding operations. In some cases, the simplified cooling systems may be located solely in the mold support plates, which allows the mold sides to be changed without the need for changing the cooling system. In summary, the simplified cooling systems of the disclosed low constant pressure injection molding molds are more economical and more effective than conventional complex cooling systems found in conventional high pressure injection molds.

Generally speaking, a mold support plate physically supports and reinforces a mold side. Two or more mold sides (or mold cores) define a mold cavity. A mold support plate may support a mold side by continuous contact along a length and width of a mold side. Alternatively, a mold support plate may support a mold side by intermittent or partial physical contact with the mold side. Such intermittent or partial physical contact may be used for a variety of reasons such as (i) to focus the load bearing contact on certain locations (e.g., reinforced locations) of the mold side, (ii) to direct the location of portions of the thermal exchange or heat flow between specific parts of the mold side and the mold support plate, or (iii) to accommodate the special needs for a given apparatus. The mold support plate may remain in contact with the mold side throughout the molding process, or the mold support plate may completely separate from the mold side for certain periods of time during the molding process. Moreover, the mold support plate may be formed of two or more separate pieces that are fixed to one another. The mold support plate may be made of a material with a high thermal conductivity (e.g., 30 BTU/hr Ft ° F.). In some embodiments, the mold support plate may be made of a material having a higher thermal conductivity than the material of the mold side, or vice versa. In yet other embodiments, the mold support plate may have a thermal conductivity that is identical to the thermal conductivity of the mold side. In one example, the mold support plate may be made of CuBe, or least a portion of the mold support plate may be made of CuBe, which contacts the mold side that may be made of aluminum. While the mold support plates illustrated in the drawings are generally formed from a single piece of material, in other embodiments, the mold support plates may be formed from multiple pieces of similar or different material that are fixed to one another.

Cooling systems of all sorts may be categorized in a system of cooling complexity levels, with cooling complexity level zero representing the most simple cooling system and higher cooling complexity levels representing progressively more complex cooling systems. This system of cooling system categorization is discussed below in more detail. However, conventional high productivity consumer product injection molding machines (e.g., class 101 and 102 molding machines) employ complex cooling systems to reduce cycle time and improve productivity. Generally speaking, high productivity consumer product injection molding machines include complex cooling systems (i.e., cooling systems having a level four cooling system complexity level or higher). Level zero to level three cooling complexity level systems generally do not produce cooling capacity that is sufficient for conventional high productivity injection molds, which include molds made of high hardness, low thermal conductivity materials.

Advantageously, the disclosed low constant pressure injection molds include cooling systems having cooling complexity levels of three or less, preferably cooling complexity level three, two, or one, which lowers production costs and increases efficiency over conventional high pressure injection molding machines.

As used herein, a cooling complexity level zero mold assembly is defined as a mold assembly that includes no active cooling system. In other words, a cooling complexity level zero mold assembly is only passively cooled through the conduction of heat through the mold sides and through the mold support plates, and eventually to the atmosphere surrounding the mold assembly. Cooling complexity level zero mold assemblies typically have relatively long cycle times (as it takes a significant amount of time for the plastic within the mold to freeze because of the slow cooling rate). As a result, high productivity consumer product mold assemblies (e.g., mold assemblies used in class 101-102 molding machines) do not use cooling complexity level zero mold assemblies.

Turning now to FIGS. 5A-5E, different embodiments of a cooling complexity level one mold assembly 328 (and/or different embodiments of a mold support plate in the mold assembly) are illustrated. The mold assembly 328 may include a mold 370 having a first side 372 and a second side 374. The first side 372 and the second side 374 form a mold cavity 376 therebetween. The first side 372 may be supported by a first mold support plate 378 and the second side 374 may be supported by a second mold support plate 380. The first and second mold support plates 378, 380 may be attached to a press (not shown), which actuates to move the first and second sides 372, 374 during the molding process. One or more cooling lines 382 may be formed in one or more of the mold support plates 378, 380. Because the first and second sides 372, 374 are made from a highly thermally conductive material, heat flows through the first and second sides 372, 374 to the mold support plates 378, 380 at a rate that is sufficient to cool plastic in the mold cavity 376 in an acceptable amount of time.

The mold support plates 378, 380 may include posts or other projections 381 that extend outward, away from the mold support plate 378, 380, towards the mold 370. The cooling lines 382 may extend into the projections 381. The mold 370 may include a complementary feature so that the mold may fit around (FIG. 5B), within (FIG. 5C), or upon (FIGS. 5D and 5E) the projections 381. In this way, the cooling lines 382 may be located closer to the mold cavity without extending the cooling lines 382 into the mold 370 or into the first and second mold sides 372, 374. As a result, the mold support plates 378, 380 may receive molds having a variety of different mold cavity shapes. The molds may thus be formed without cooling lines integrated into the first and/or second sides 372, 374, which reduces manufacturing costs of the molds 370.

Conventional high output consumer product injection mold assemblies do not use cooling complexity level one mold assemblies because such mold assemblies do not adequately cool plastic with in a mold cavity formed by two high hardness, low thermal conductivity materials. Cooling complexity level one mold assemblies are defined as containing all active cooling lines 382 within the mold support plates 378, 380, even if more than one machining axis is needed to form the cooling lines 382. In the example of FIGS. 5A-5E, the mold may be a stack mold, a cube mold, a shuttle mold, a helicopter mold, a mold having rotating platens, or other multi-cavity molds to increase productivity if desired.

Figure 6:
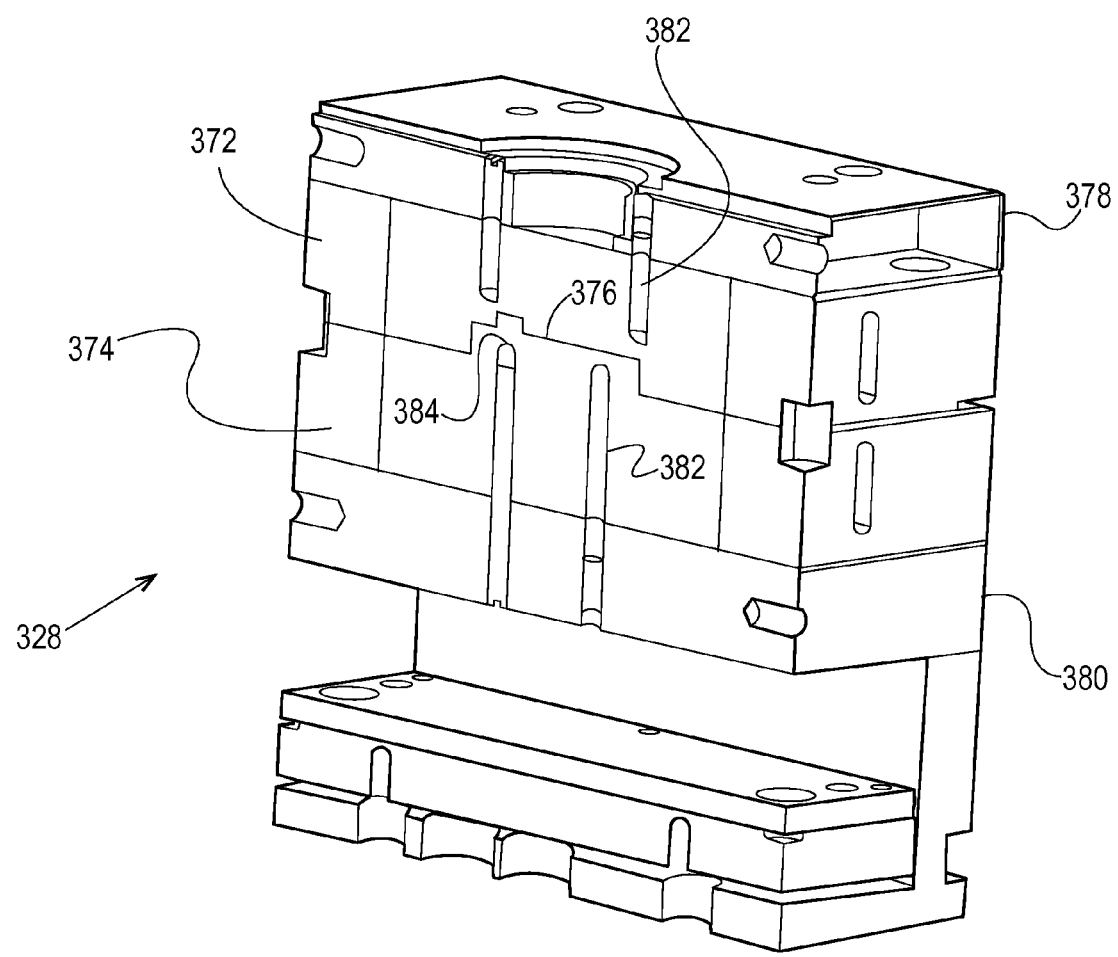
FIG. 6 illustrates a cross-sectional view of a mold assembly having a plurality of cooling lines machined in a mold support plate that extend into a mold side.
Figure 7:
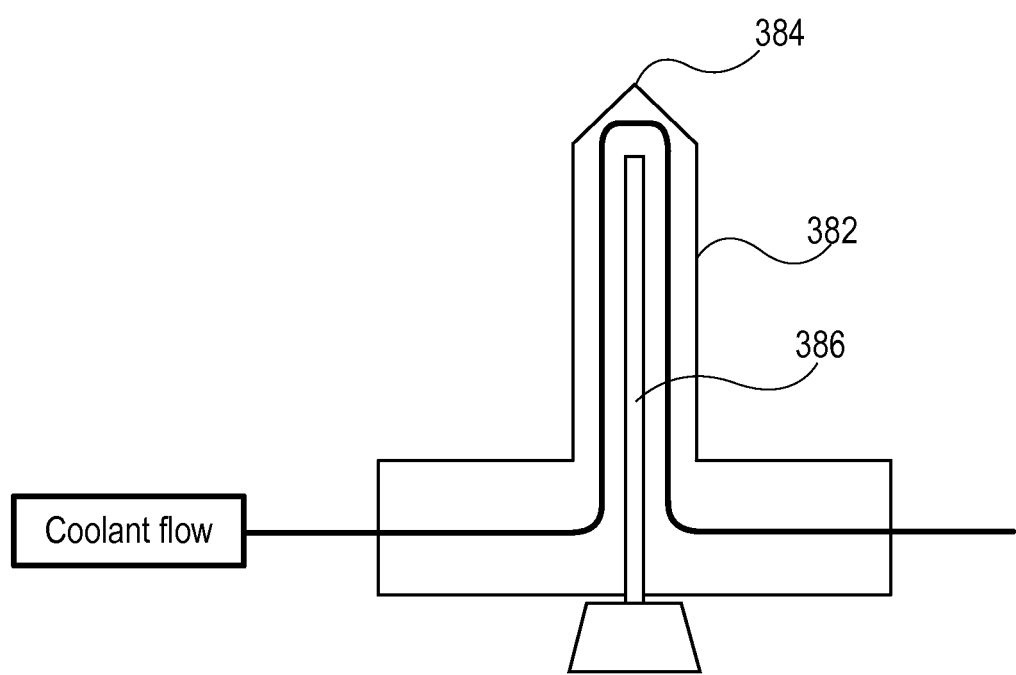
FIG. 7 illustrates a close-up sectional view of a cooling line including a baffle.

Turning now to FIG. 6, a cooling complexity level two mold assembly 328 is illustrated. The cooling complexity level two mold assembly 328 is identical to the cooling complexity level one mold assembly 328 of FIGS. 5A-5E, with the exception that the cooling lines 382 in the embodiment of FIG. 6 extend through at least one mold support plate 378, 380 and into at least one mold side 372, 374 (i.e., as opposed to the cooling lines 382 only extending through the mold support plates 378, 380). The cooling lines 382 have terminal ends 384. However, each cooling line 382 is machined along an axis that is parallel to a single machining axis. The cooling lines 382 may include a baffle 386, as shown in more detail in FIG. 7, to facilitate cooling fluid flow through the cooling line 382. Cooling complexity level two mold assemblies have not been used in high output consumer product injection molding machines (i.e., class 101-102 injection molding machines) because cooling complexity level two mold assemblies do not have enough flexibility to machine cooling lines close to the mold surfaces of the mold cavity and therefore, cooling complexity level two mold assemblies do not provide adequate cooling for conventional high output mold assemblies having high hardness, low thermal conductivity molds.

Figure 8:
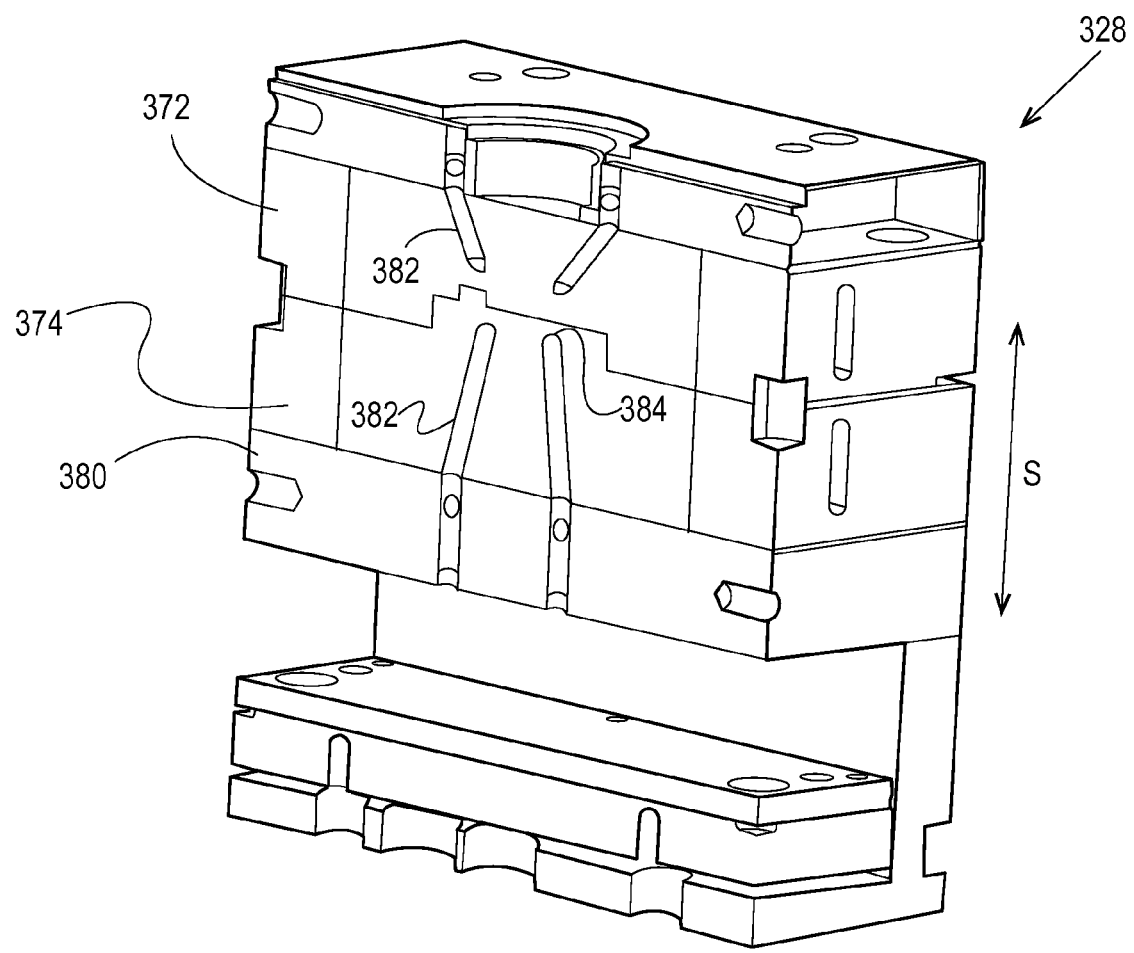
FIG. 8 illustrates a perspective cross-sectional view of a mold assembly including a plurality of cooling lines machined along at least two different axes.

Turning now to FIG. 8 an embodiment of a cooling complexity level three mold assembly 328 is illustrated. A cooling complexity level three mold assembly 328 is defined by cooling channels 382 having at least two different machining axes. At least one cooling line 382 may include two different machining axes and a terminal end. More particularly, the cooling line 382 may have a bend or turn. For example, the cooling line 382 may include a first machining axis that is substantially parallel to the opening-closing stroke S of the mold assembly 328 and a second machining axis that is angled with respect to the first machining axis. Like cooling complexity level two mold assemblies, cooling complexity level three mold assemblies have not been used in high output consumer product injection molding machines (e.g., class 101-102 injection molding machines) because level three cooling complexity does not have enough flexibility to machine cooling lines close to the mold surfaces of the mold cavity and therefore, cooling complexity level three mold assemblies do not provide adequate cooling for conventional high output mold assemblies having high hardness, low thermal conductivity molds.

Figure 9:
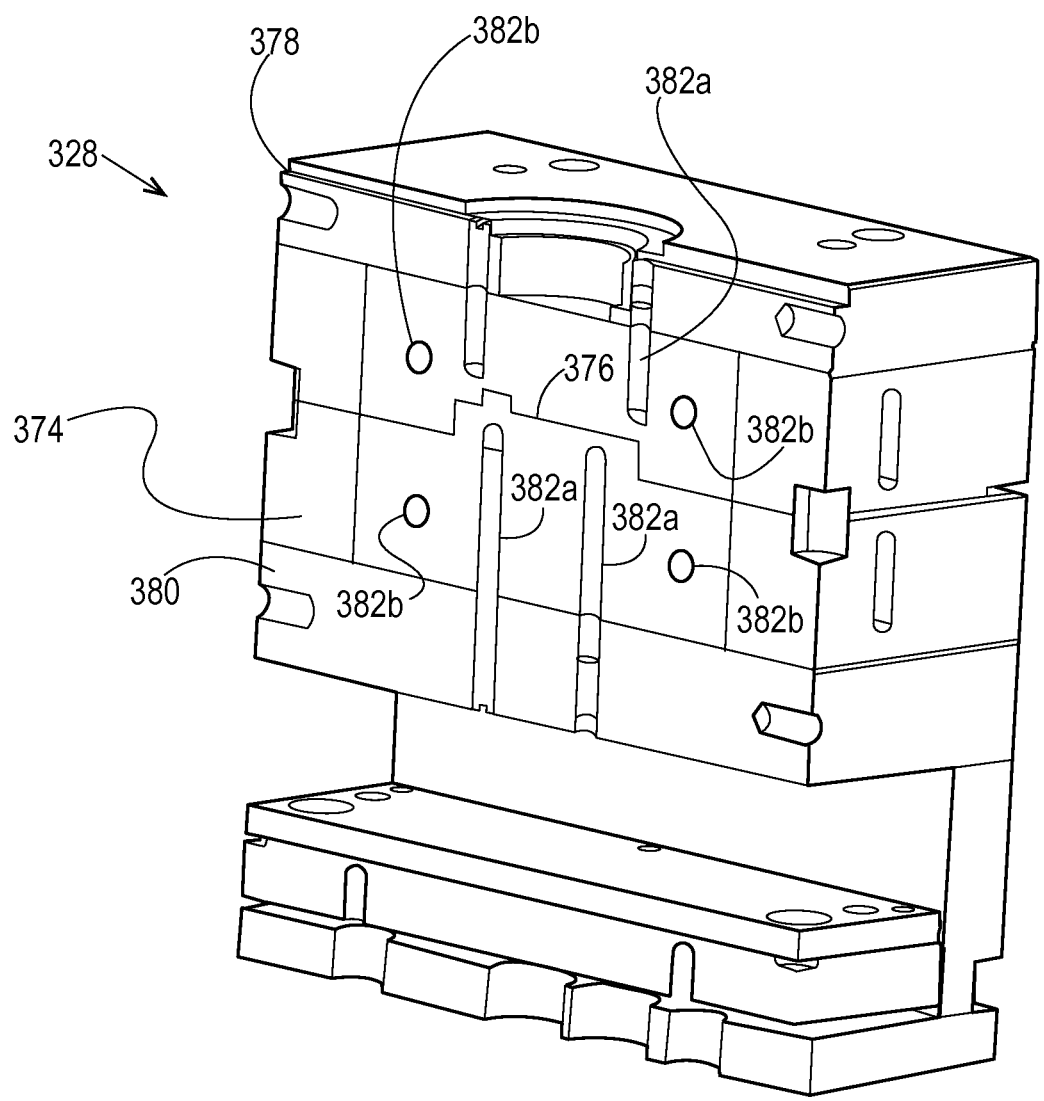
FIG. 9 illustrates a perspective cross-sectional view of a mold assembly having a plurality of terminal cooling lines and a plurality of through bore cooling lines machined along at least two different machining axes.

Turning now to FIG. 9, a cooling complexity level four mold assembly 328 is illustrated. The cooling complexity level four mold assembly 328 includes a plurality of cooling lines 382, a first cooling line 382*a* having a terminal end 384 and a second cooling line 382*b* being a through-bore without a terminal end. The first cooling line 382*a* extends from the mold support plate 378 into the first mold side 372 and the second cooling line 382*b* extends through the first mold side 372. A machining axis for the first cooling line 382*a* is different from a machining axis for the second cooling line 382*b*. In other words, the cooling lines 382 have at least two different machining axes for formation. Cooling complexity level four mold assemblies have been used in some high output consumer product injection molding machines (e.g., class 101-102 injection molding machines) having mold assemblies with very simple mold cavity geometries.

Figure 10:
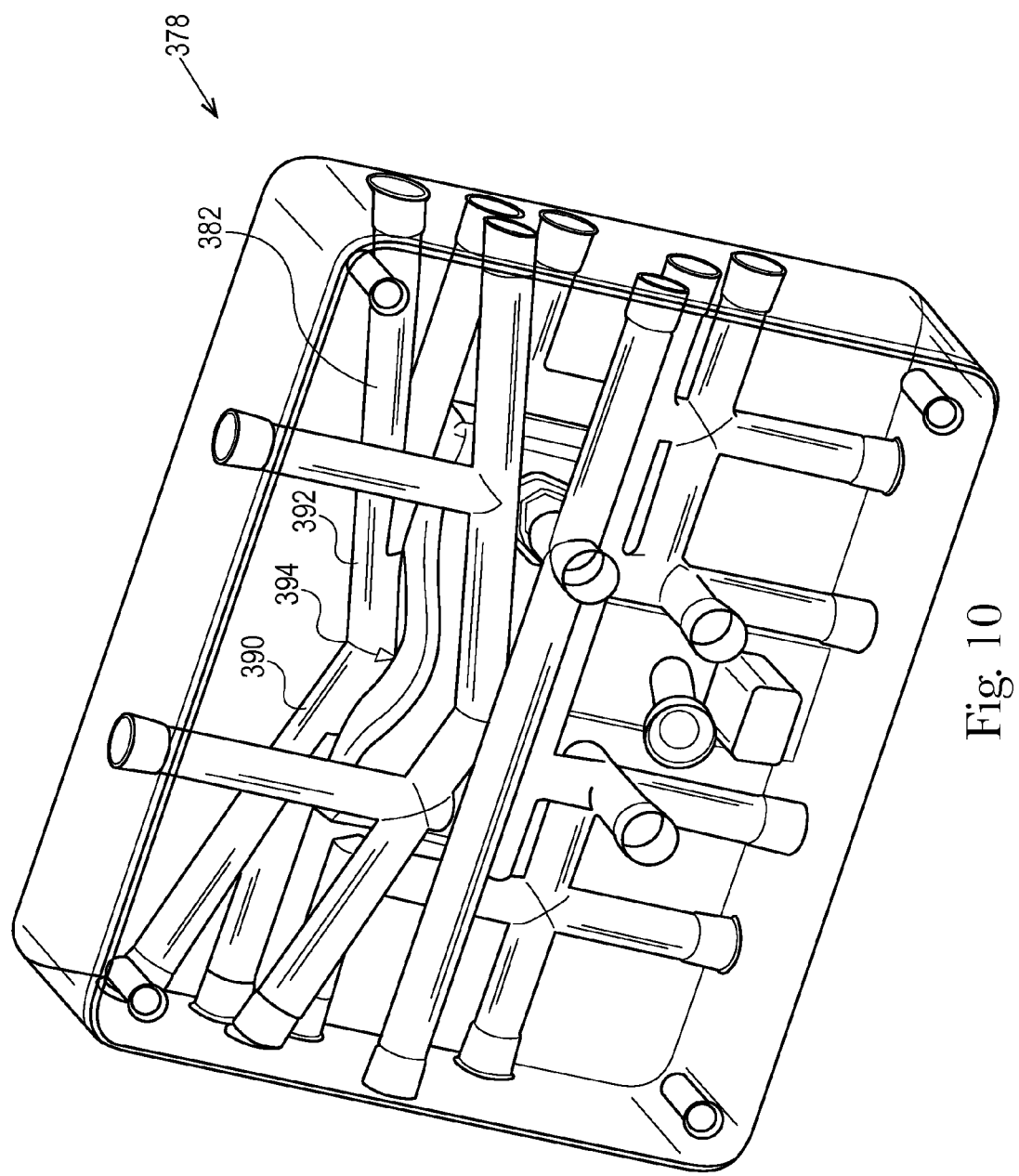
FIG. 10 illustrates a perspective partially transparent view of a mold assembly having a plurality of cooling lines, at least one of the cooling lines being formed by two terminal cooling lines that join one another at terminal ends to form a non-terminal cooling line, each terminal cooling line being machined along a different machining axis.

Turning now to FIG. 10, a cooling complexity level five mold assembly 328 is illustrated. The cooling complexity level five mold assembly 328 includes a first cooling line 382 that is a through-bore having two different machining axes. As illustrated in FIG. 10, the first cooling line 382 includes a first section 390 and a second section 392 that are angled with respect to one another and meet at a junction or turn 394. Machining the first cooling line 382 with two different axes that must meet at an internal location in the mold part requires great precision and thus more costly equipment, along with a greater manufacturing time. However, cooling complexity level five mold assemblies 328 have been used in high output consumer product injection molding machines (e.g., class 101-102 injection molding machines) because cooling complexity level five mold assemblies allow for greater customization in cooling line placement. Thus, cooling lines can be placed closer to the mold cavity than in cooling complexity mold assemblies of lesser complexity. As a result, the more complex cooling complexity mold assembly can at least partially offset the drawback of lower thermal conductivity found in conventional injection molds made of high hardness, low thermal conductivity materials.

Turning now to FIG. 11, a cooling complexity level six mold assembly 328 is illustrated. The cooling complexity level six mold assembly 328 is a cooling complexity level one to five mold assembly that also includes at least one actively cooled dynamic molding part 398. Forming cooling channels in a dynamic molding part 398 requires great precision. Moreover, actively cooled dynamic molding parts 398 require complicated flow mechanisms that move with the dynamic molding part 398 during operation of the mold assembly 328. Cooling complexity level six mold assemblies have been used in high output consumer product injection molding machines (e.g., class 101-102 injection molding machines).

Figures 12A, 12B:
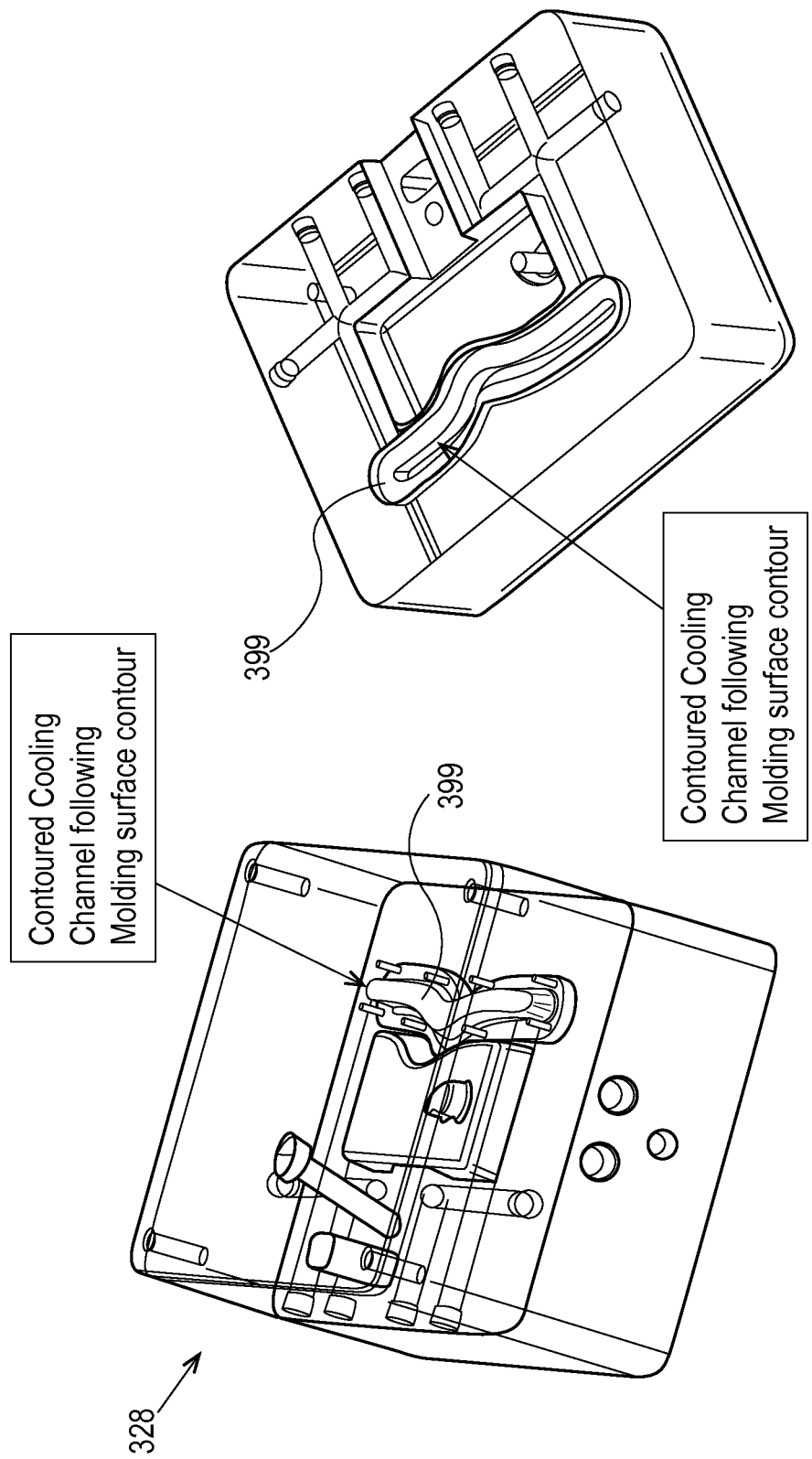
FIG. 12 illustrates a perspective view of a mold assembly having at least one cooling line that includes non-linear, non-coaxial, or non-planar cooling channel.

Turning now to FIG. 12, a cooling complexity level seven mold assembly 328 is illustrated. The cooling complexity level seven mold assembly 328 is a cooling complexity level two through six mold assembly that includes at least one conformal cooling cavity 399. The conformal cooling cavity 399 at least partially complements the contours of the mold cavity to provide maximum active cooling. The conformal cooling cavity 399 is non-linear, non-coaxial, and/or non-planar. Conformal cooling cavities 399 require complex machinery to form. Additionally, conformal cooling cavities 399 take significant amounts of time to form. As a result, cooling complexity level seven mold assemblies are very expensive and are generally reserved for high output consumer product injection molding machines that have very intricate part geometries.

Figure 13:
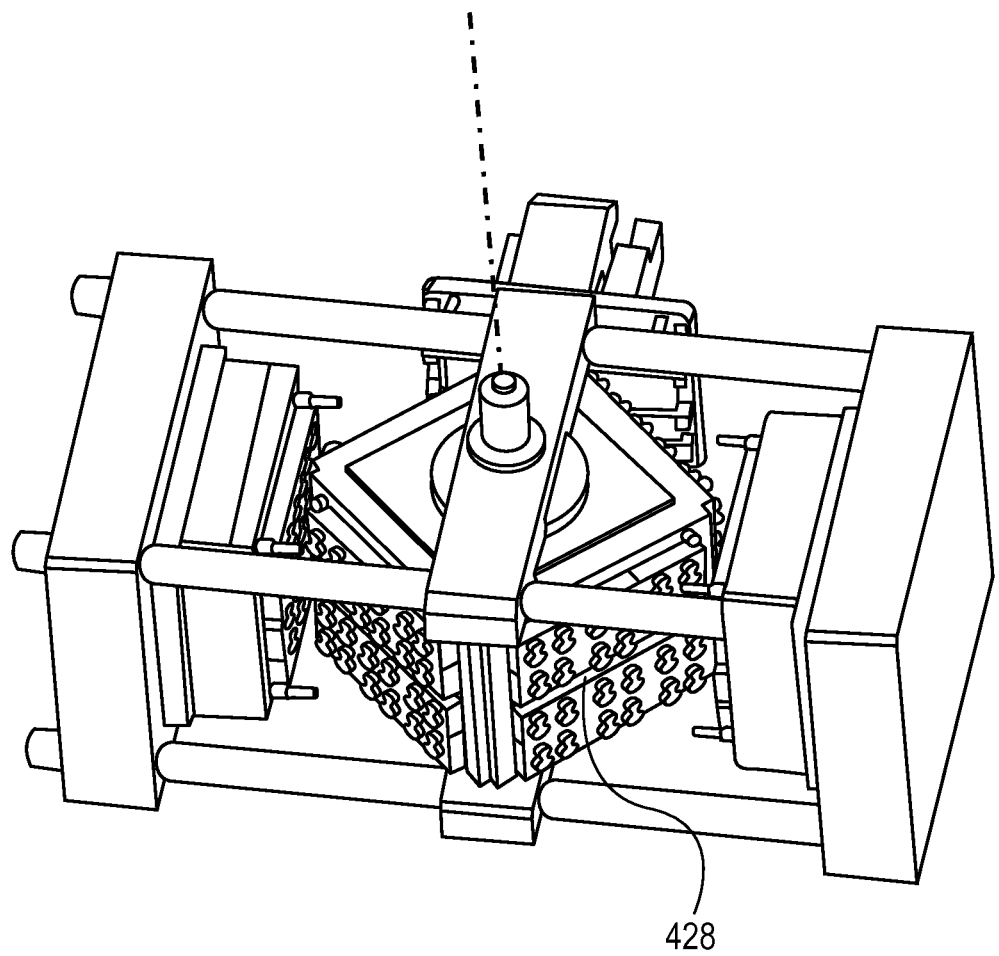
FIG. 13 illustrates one embodiment of a cube mold that incorporates a mold having a simplified cooling system.

The simplified cooling systems described herein may be incorporated into virtually any type of conventional injection mold, such as an injection molding machine having a cube mold assembly 428, as illustrated in FIG. 13.

Returning now to FIGS. 5A-5E, in some embodiments, a level one cooling complexity level injection mold assembly may include an evaporative cooling system. Evaporative cooling systems are more efficient in removing heat than liquid based cooling systems. In some examples, evaporative cooling systems may be 100 times more efficient, or even 500 times more efficient, at removing heat than liquid based cooling systems. Because the injection mold assemblies described herein are made of materials having high thermal conductivity, these mold assemblies may include more simplified cooling systems (by moving cooling lines farther away from the mold cavity) while increasing heat removal by including evaporative cooling systems. Moving cooling lines away from the mold cavity produces more uniform temperature distributions throughout the mold sides. Advantageously, level one cooling complexity mold assemblies having evaporative cooling systems do not need complex dynamic seals between the mold support plates and the mold sides because the cooling fluid lines do not extend into the mold sides. As a result, the evaporative cooling systems in level one cooling complexity level mold assemblies are more robust and less prone to failure than evaporative cooling systems in prior art mold assemblies that required the cooling fluid to extend into the mold sides.

Generally speaking, evaporative cooling systems exploit a phase change in a cooling fluid to extract more heat from the mold assembly than a conventional all liquid cooling system could extract. By using localized pressure differentials, the circulating fluid alternates between a liquid and a gas phase. Transition from a liquid to a gas phase is highly endothermic. When the liquid cooling fluid passes through a region of elevated temperature (such as the mold support plate, or an evaporator), the cooling fluid absorbs heat from the mold support plate and changes phase to a gas. The gas then passes to a region of lower temperature, such as a condenser, where heat is transferred from the gas to the environment. This heat transfer causes the gas to condense back into a liquid that may be pumped back into the mold support plate to absorb more heat and the cycle is repeated. Evaporative cooling systems may be ten times more effective, 100 times, or even 500 times more effective at removing heat than conventional all liquid cooling systems.

Figure 14:
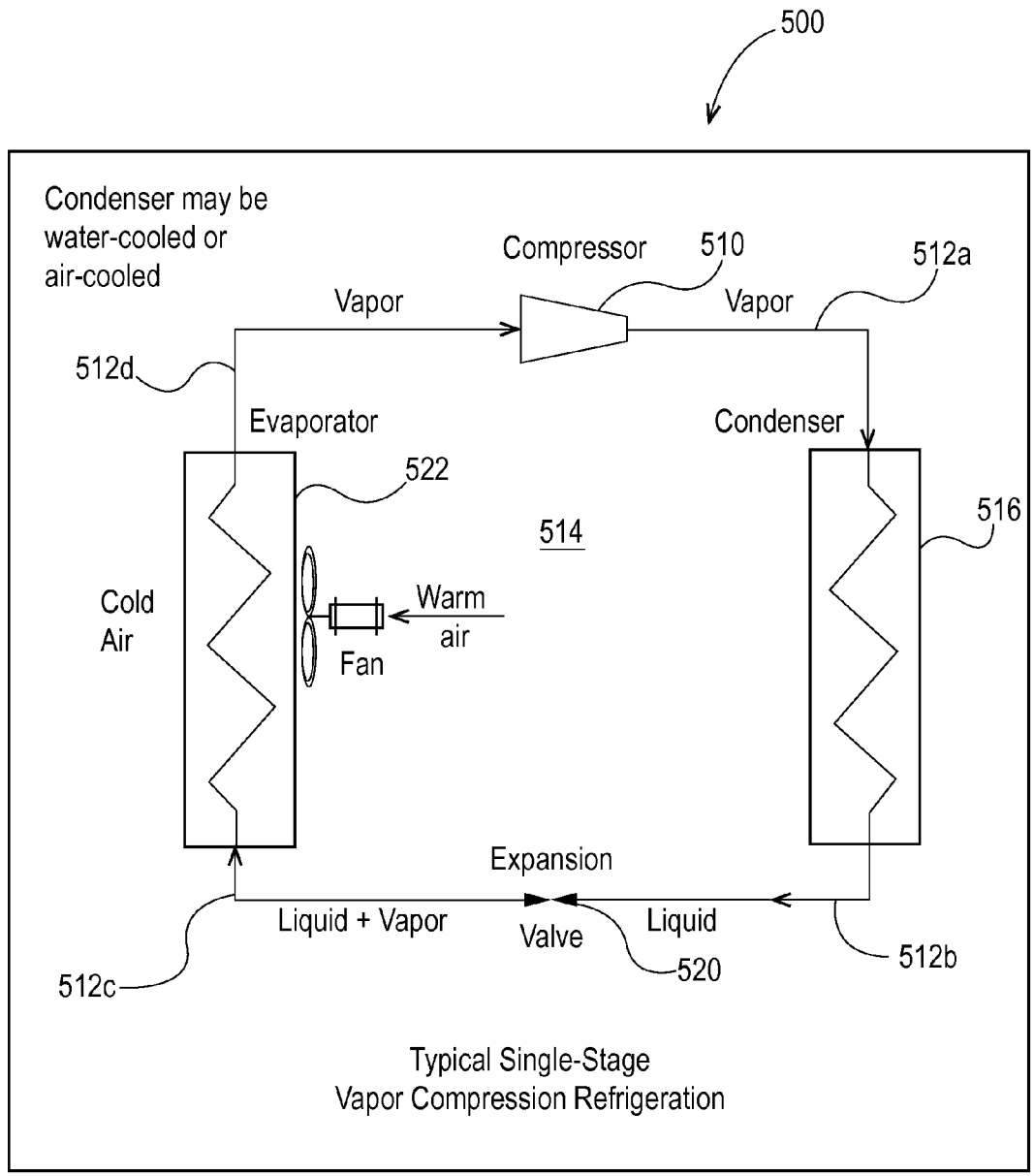
FIG. 14 illustrates one embodiment of a vapor compression evaporative cooling system.

More specifically, a refrigeration-type vapor compression cooling system 500 is illustrated in FIG. 14. The vapor compression cooling system 500 includes a compressor 510 that increases pressure of a cooling fluid within cooling lines 512a,b of a cooling circuit 514, which causes the temperature of the cooling fluid to rise in cooling line 512a according to the combined gas law (i.e., $\rho_1 V_1/T_1 = \rho_2 V_2/T_2$). After being compressed, the elevated temperature cooling fluid enters a heat exchanger or condenser 516. The elevated temperature cooling fluid exchanges heat with the atmosphere (or other medium), and the cooling fluid cools below its evaporation temperature, thus condensing into liquid form. The liquid cooling fluid then moves through cooling line 512b to an expansion valve 520, where the volume of the cooling liquid is increased, causing the pressure of the cooling liquid to decrease, which causes the cooling fluid to at least partially evaporate, again according to the combined gas law. Some of the cooling fluid may vaporize so that a combination of liquid and gas cooling fluid moves through cooling line 512c to an evaporator 522. In one embodiment, a mold support plate may comprise the evaporator 522.

The mold support plate may include one or more cooling channels for moving cooling fluid through the mold support plate to remove heat from the mold support plate. The evaporator surfaces are relatively warm, compared to the cooling fluid in the evaporator 522. Thus, heat is transferred from the evaporator (e.g., the mold support plate) to the cooling fluid, which results in vaporization of a majority of the remaining cooling fluid.

After exchanging heat and vaporizing in the evaporator 522, the cooling fluid moves through cooling line 512d to the compressor 510 and the process is repeated. The evaporator 522, the compressor 510, the condenser 516, and the expansion valve 520 are all fluidly connected to one another by the cooling lines 512a-d. In some embodiments, the entire cooling circuit 514 may be located within or on the evaporator 522 or mold support plate. In other embodiments, the mold support plate may comprise the evaporator 522 (having one or more cooling channels located within the mold support plate), while one or more of the compressor 510, the condenser 516, and the expansion valve 520 may be physically separated from the mold support plate, while being fluidly connected to the mold support plate via the cooling lines 512a-d.

Figure 15:
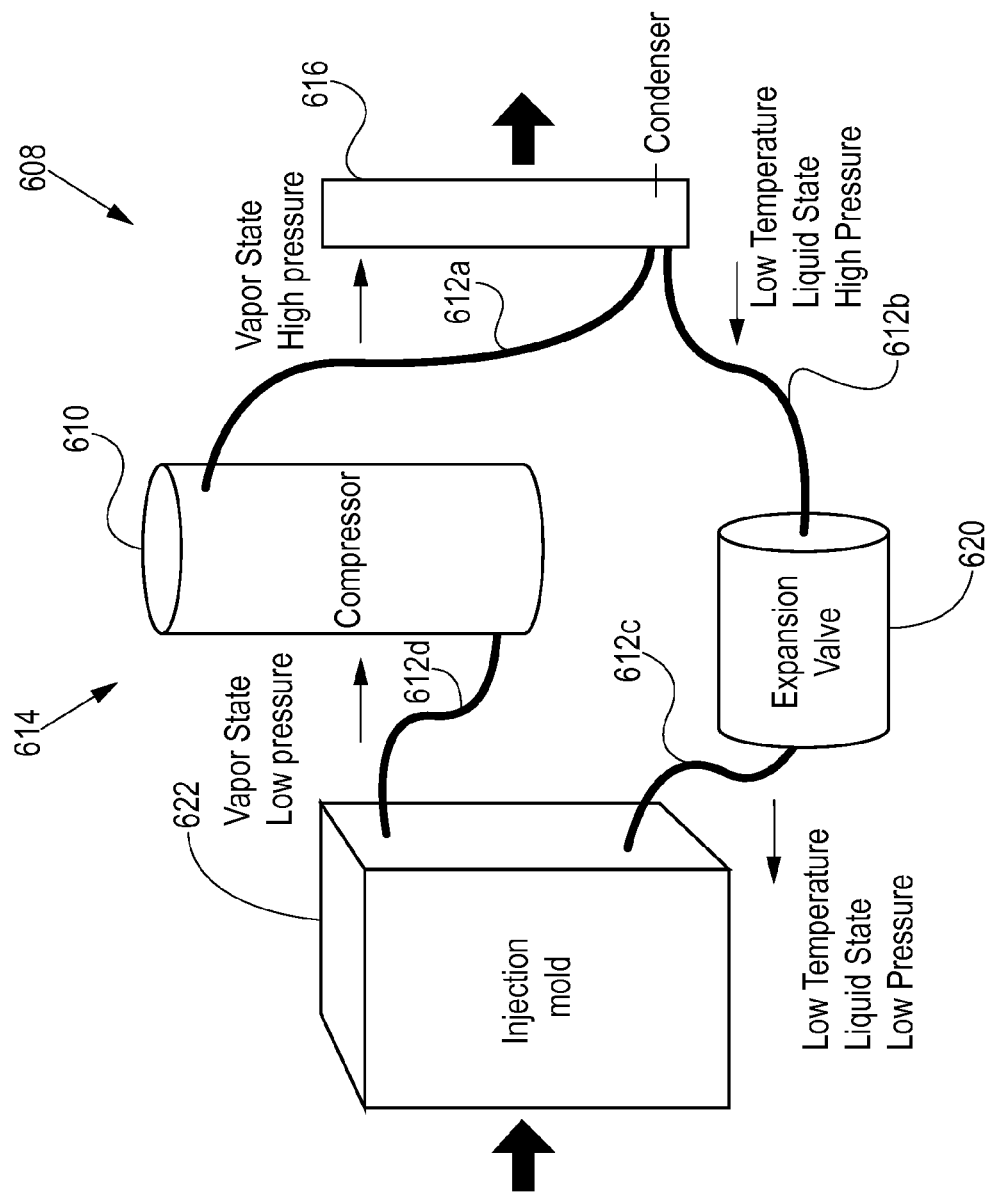
FIG. 15 illustrates another embodiment of an evaporative cooling system.

FIG. 15 illustrates one embodiment of an evaporative cooling system 600 that may be used in an injection molding machine. The evaporative cooling system 600 includes the same elements as the evaporative cooling system of FIG. 14, with respective elements having reference numerals increased by 100. The evaporative cooling system 600 includes a compressor 610, a condenser 616, an expansion valve 620 and an injection mold 622, all fluidly connected by a plurality of cooling lines 612a-d to form a closed loop cooling circuit 614. In the embodiment of FIG. 15, the injection mold 622 itself, and more specifically a mold support plate of the injection mold 622, forms the evaporator.

Cooling fluid flowing through the injection mold 622 removes heat from the injection mold 622, thereby cooling molten plastic within the injection mold 622. The increased cooling capacity of the evaporative cooling system 600 reduces cycle time of the injection mold 622 by removing heat more quickly than traditional cooling systems that move cooling liquid only through cooling channels.

Figure 16A:
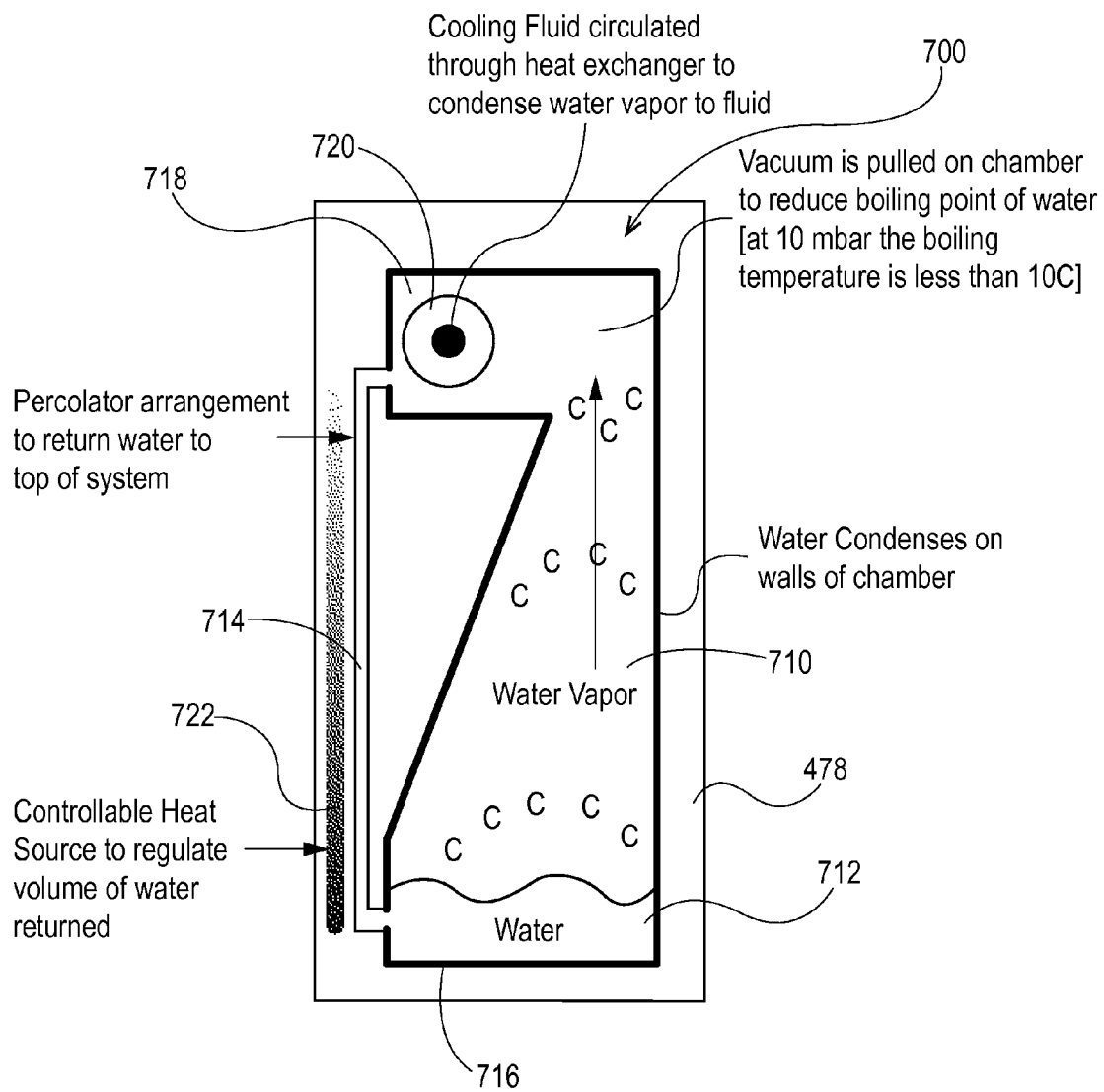
FIG. 16A illustrates an embodiment of an evaporative cooling system contained, at least partially, within a mold support plate.

Turning now to FIG. 16A, another example of an evaporative cooling system 700, which is located in a mold support plate 478 of an injection mold, is illustrated. The evaporative cooling system 700 includes a chamber 710 within the mold support plate 478. An evaporative liquid 712, such as water, is disposed within the chamber 710. A percolator tube 714 connects a reservoir portion 716 of the chamber 710 to a condensing portion 718 of the chamber 710. The percolator tube 714 assists in moving water from the bottom of the chamber 710 to the top of the chamber 710. A cooled condenser 720 may be located near the top of the chamber 710. As heat from the mold side (which would be located to the right in FIG. 16A) warms the mold support plate 478, liquid water in the reservoir portion 716 evaporates and travels upwards through the chamber towards the condensing portion 718. This evaporation process removes heat from the mold support plate 478 and thus, from the mold side adjacent the mold support plate 478. When the water vapor reaches the condenser 720, heat again transfers from the water vapor to the condenser 720, which causes the water vapor to condense back into liquid form. This liquid water then runs down the sides of the chamber 710 towards the reservoir portion 716. Some of the liquid water will re-evaporate from the side walls of the chamber and some of the liquid water will reach the reservoir portion 716 before re-evaporating. To enhance evaporation from the side walls of the chamber 710, a coating may be applied to the side walls that enhances retention of liquid water against the side walls by increasing surface tension between the liquid water and the side walls. A controllable heat source 722 may optionally be disposed within the mold support plate 478 (or be attached to the mold support plate 478) to regulate the volume of water returned to the condensing section 718 through the percolator tube 714.

Figure 16B:
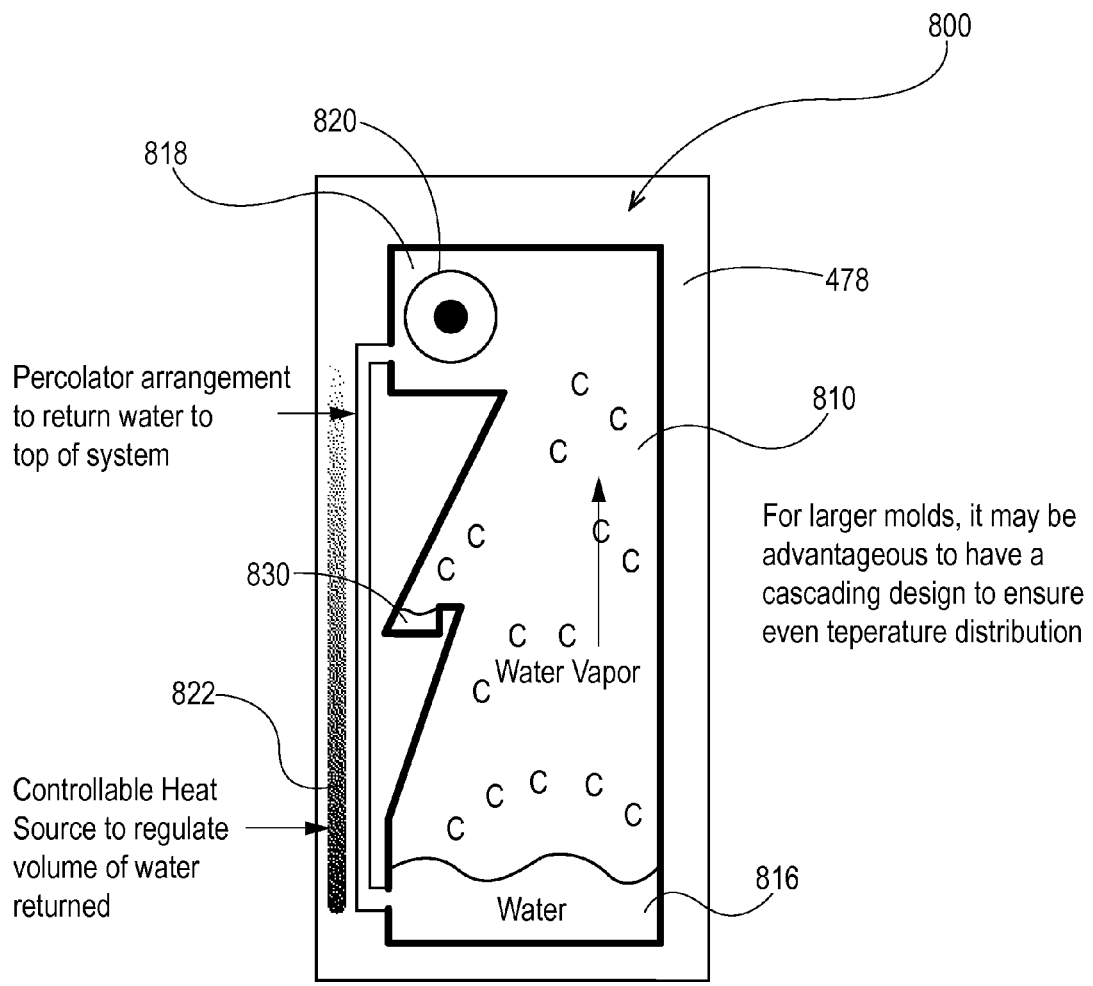
FIG. 16B illustrates an alternate embodiment of an evaporative cooling system contained, at least partially, within a mold support plate.

FIG. 16B illustrates an alternate embodiment of an evaporative cooling system 800. Elements of the evaporative cooling system 800 like those of the evaporative cooling system 700 of FIG. 16A have reference numerals that are 100 greater than the elements in FIG. 16A. The main difference in the evaporative cooling system 800 of FIG. 16B is that an additional collection portion 830 is located within the chamber 810 vertically between the condensing portion 818 and the reservoir portion 816. The collection portion 830 may facilitate collection and re-evaporation of liquid water for larger (or longer) mold support plates.

While not illustrated, the evaporative (and vapor compression) cooling systems 500, 600, 700, and 800 of FIGS. 14, 15, 16A, and 16B may include a vacuum system to lower relative pressures of the cooling fluids. Lowering relative pressures of the cooling fluids lowers the evaporation temperature for a given cooling fluid (all other factors being equal). Conversely, the evaporative (and vapor compression) cooling systems 500, 600, 700, and 800 may include a pressurization system to increase relative pressure of the cooling fluid. Raising relative pressure of the cooling fluid raises the evaporation temperature of a given cooling fluid (all other factors being equal). In this way, the evaporation temperature may be tailored to the temperatures typically experienced by a particular mold.

Evaporative cooling systems may use many different types of cooling fluids, such as refrigerants (e.g., chlorofluorocarbons, chlorofluoroolefins, hydrochlorofluorocarbons, hydrochlorofluoroolefins, hydrofluorocarbons, hydrofluoroolefins, hydrochlorocarbons, hydrochloroolefins, hydrocarbons, hydroolefins, perfluorocarbons, perfluoroolefins, perchlorocarbons, perchloroolefins, and halon/haloalkane, and blends thereof), water, glycol, propylene glycol, alcohol, or mercury. Other refrigerants having cooling capacities and/or physical or chemical properties similar to the refrigerants listed above may also be used. Similarly, other cooling fluids that undergo a phase change when exposed to temperatures between about 0° C. and about 200° C. at pressures between 0 psi (i.e., complete vacuum) and about 2000 psi, may also be used. In some cases a surfactant may be added to the cooling fluid. Some evaporative cooling systems may utilize a vacuum system to create differential pressure, while other evaporative cooling systems may utilize compressors to create differential pressure.

In yet other embodiments, the evaporative cooling system may employ atmospheric liquid evaporation to remove heat. Because the disclosed mold assemblies are made of highly thermally conductive materials, in some cooling complexity level zero mold assemblies it is possible to simply spray a cooling liquid on the outer surface of the mold support plates or mold sides, which evaporates as the liquid absorbs heat, thereby cooling the mold support plate or the mold side. One type of liquid that may be advantageously employed in these types of systems is distilled water. Distilled water will completely evaporate without leaving any type of residue on the mold support plate or mold side. In some embodiments, fins or radiator structures may be used to increase surface area of the mold support plate or mold side to further facilitate evaporation and heat removal.

Figure 17:
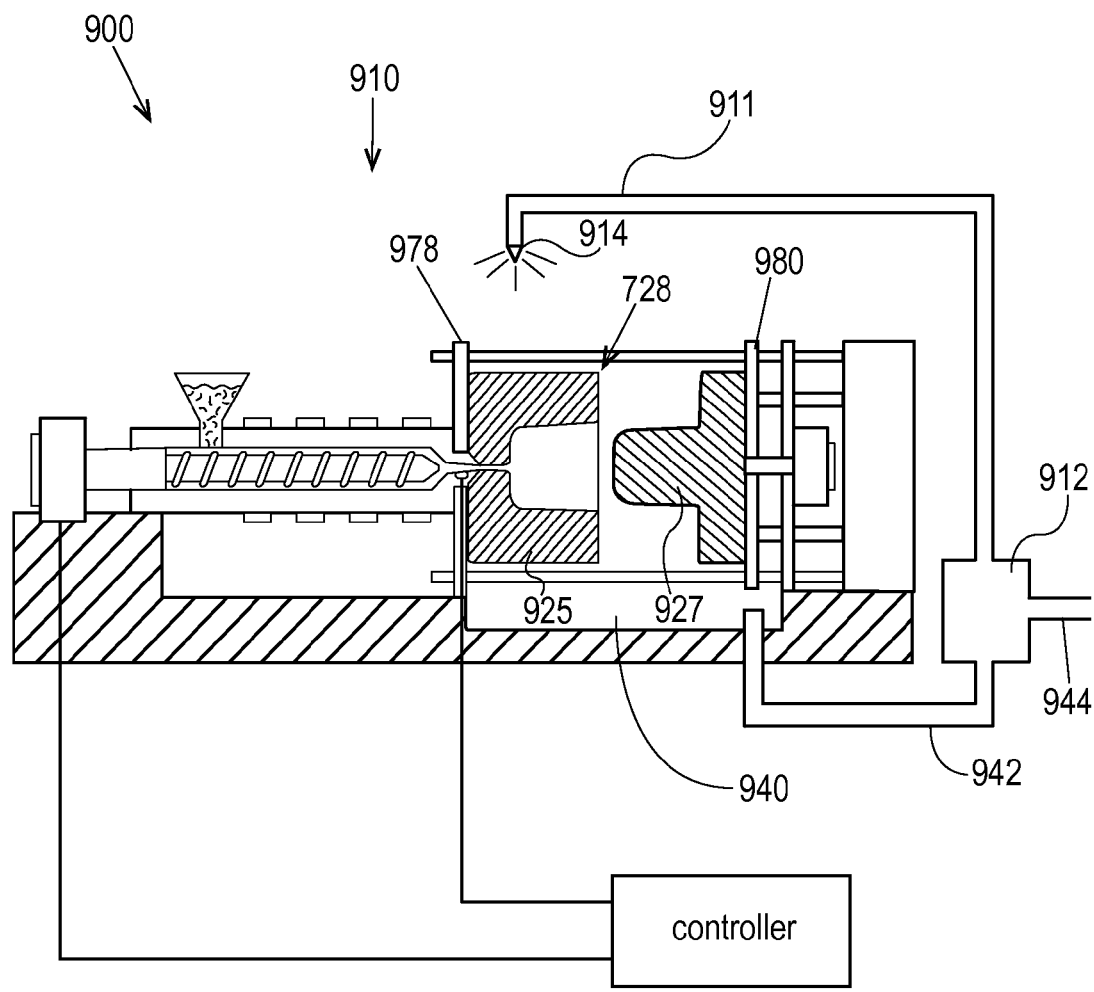
FIG. 17 illustrates one embodiment of an external evaporative cooling system.

One example embodiment of an evaporative cooling system 900 that employs atmospheric liquid evaporation is illustrated in FIG. 17. The mold 910 may include a first mold side 925 and a second mold side 927. A first mold support plate 978 and a second mold support plate 980 may be located adjacent the first and second mold sides 925, 927, respectively. A spray bar 911 may be positioned near one of the mold support plates 978, 980, and/or near one of the mold sides 925, 927. The spray bar 910 is fluidly connected to a pump 912, which pumps liquid (for example water) to the spray bar 910 under pressure. The liquid is sprayed out of a nozzle 914 so that the sprayed liquid coats an outer surface of one of the mold support plates 978, 980 and the mold sides 925, 927. As the liquid coats the outer surface, heat from the mold support plate 978, 980, and/or the mold side 925, 927, causes the liquid to evaporate, thus cooling the mold support plate 978, 980 and/or the mold side 927, 927. Liquid that does not evaporate may drip down and collect in a liquid collection area or sump 940. The sump 940 is an area or reservoir for collecting liquid that does not evaporate. A return line 942 extends from the sump 940 to the pump 912 to channel water from the sump 940 back to the spray bar 911. The pump 912 may also be connected to a source of liquid 944 so that a supply of liquid is always available to the spray bar 911, regardless of the level of liquid in the sump 940.

In the embodiment illustrated in FIG. 17, evaporated liquid simply vents to the atmosphere and fresh liquid is supplied through the source of liquid 944 to make up for the lost evaporated liquid. In other embodiments, the entire mold 910 may be located in a closed environment and the evaporated liquid may be condensed and returned to the sump 940.

The disclosed mold assemblies may include cooling systems having cooling channels that are completely confined within a mold support plate. As a result, the disclosed systems do not need any dynamic seals (e.g., seals between moving parts) and the risk of cooling fluid escaping to the atmosphere, or being released into the environment is reduced.

As described above, the cooling systems disclosed herein, for a level one cooling complexity mold, include cooling channels only in one or more of the mold support plates. In other words, there are no cooling channels in either the first mold side or the second mold side. As a result, all seals in the cooling systems are static in nature and very robust. Stated another way, there are no seals between components that move relative to one another in the disclosed cooling systems, which would require softer, dynamic seals. Thus, the disclosed cooling systems may use dangerous, hazardous, or expensive cooling fluids (sometimes referred to as "exotic cooling fluids") as there is little chance of seal breach, which would result in release of the cooling fluid. Some dangerous, hazardous, or expensive cooling fluids may have superior heat absorption properties when compared to traditional cooling fluids. However, these dangerous, hazardous, or expensive cooling fluids have not been previously used in cooling systems for injection molds for fear of seal breach (especially a breach in dynamic seals between moving parts), which would release these cooling fluids to the atmosphere. Particularly useful dangerous, hazardous, or expensive cooling fluids that may now be used in the disclosed cooling systems (due to the very low risk of these cooling fluids escaping to the atmosphere) include heating oil, hydraulic fluid, glycols, cesium, mercury, potassium (which has a thermal conductivity of approximately 42 W/mK at 25° C.), lead-bismuth eutectic, sodium potassium alloy, sodium potassium cesium alloy, and lead-bismuth.

Desirable cooling fluids may have a thermal conductivity of 1 W/mK or more. More desirable cooling fluids may have a thermal conductivity of between about 1 W/mk to about 42 W/mk. Some desirable cooling liquids maintain a flowable viscosity (e.g., a cpi of 100,000 or less) at temperatures between about 5° C. and about 100° C. In addition to hazardous or dangerous cooling fluids, non-hazardous cooling fluids that are relatively expensive may also be used in the disclosed cooling systems. One such expensive, but useful, cooling fluid is distilled water, which advantageously dose not corrode internal components of the disclosed cooling systems. Distilled water, however, has not been used in conventional high productivity injection molding systems because of the need to constantly replace distilled water lost through seal breaches. These losses generally required a distillation plant on site to produce make up distilled water, which is cost prohibitive in the highly competitive consumer products injection molding industry.

By eliminating dynamic seals from the disclosed cooling complexity level one molds, a wider range of cooling fluids may be used. As described above, some potentially harmful, hazardous, or expensive cooling fluids may be used. Additionally, nanofluids may be used as cooling fluids. Nanofluids include a carrier liquid, such as water, having tiny nano-scale particles known as nanoparticles dispersed throughout the carrier liquid. Nanoparticles of solid materials (e.g., copper oxide, alumina, titanium dioxide, carbon nanotubes, silica, or metals, including copper, or silver nanorods) may be dispersed into the carrier liquid, which enhances the heat transfer capabilities of the resulting coolant compared to the carrier liquid alone. The enhancement can be theoretically as high as 350%. In some examples, nanofluids have been experimentally shown to have thermal conductivities of 50%-100% greater than the thermal conductivity of the carrier liquid alone. Nanofluids also exhibit a significant increase in heat flux when compared to traditional cooling fluids. In one example, a nanofluid may comprise ethylene glycol and copper nanoparticles, which has a thermal conductivity of approximately 1.4 W/mK at 25° C.

For example, silver nanorods of 55±12 nm diameter and 12.8 μm average length at 0.5 vol. % can increase thermal conductivity of water by 68%, and 0.5 vol. % of silver nanorods increased thermal conductivity of ethylene glycol based coolant by 98%. Alumina nanoparticles at 0.1% can increase the critical heat flux of water by as much as 70%.

Because the seals in level one cooling complexity molds are very robust in nature (because they are static seals), the seals are much more tolerant of the nanoparticles in nanofluids, which tend to degrade dynamic (softer) seals more quickly. As a result, the disclosed cooling complexity level one molds may use nanofluids to increase heat transfer rates, which results in more efficient cooling. Desirable nanofluids may have thermal conductivities of 1 W/mK or more. Examples of nanoparticles that may be added to a carrier fluid include copper oxide, alumina, titanium oxide, boron nitride nanotubes, carbon nanotubes, carbon uranium nano rods, and silver nano rods. Additionally, these nanofluids have a greater heat capacity than traditional cooling fluids. As a result, fluid circulation rates may be slowed to allow the nanofluid to remove more heat per unit volume than traditional cooling fluids. Thus, the overall cooling fluid volume needed for such a system may be reduced, causing a corresponding reduction in overall cost and complexity of the cooling system.

This increase in thermal conductivity and reduction in overall fluid volume may allow some cooling complexity level one molds that use nanofluids to employ a radiant heat type heat exchanger to cool the nanofluid before circulation through the mold support plate, as the nanofluid would linger in the heat exchanger long enough to adequately cool the nanofluid.

In some level zero cooling complexity molds, the mold may be cooled completely by convection/conduction of heat to the atmosphere. Radiator fins may be formed on the mold support plates or the mold sides to enhance convection of heat to the atmosphere. Additionally, a gas moving device, such as a fan, may move atmospheric gases over the molds and/or over the radiator fins to further enhance heat dissipation though conduction.

Generally speaking, the low constant pressure injection molding machines of the present disclosure include molds and/or mold assemblies manufactured from materials having high thermal conductivity, as discussed above. This high thermal conductivity allows the disclosed low constant pressure injection molding machines, molds, and mold assemblies to cool molded parts using cooling complexity level three mold assemblies or lower for virtually any part geometry. Preferably a cooling complexity level two mold assembly will be used to cool a molded part. More preferably a cooling complexity level one mold assembly will be used to cool a molded part. For some part geometries, a cooling complexity level zero mold assembly may even be used. The cooling complexity level three or lower mold assemblies may be used even in ultra high output consumer product injection molding machines (e.g., class 101-102 injection molding machines) where more complex cooling systems were needed for conventional injection molds made from high hardness, low thermal conductivity materials. As a result, the disclosed low constant pressure injection molds and mold assemblies, and thus the injection molding machines, are less costly to manufacture, while decreasing mold cycle times and increasing mold productivity due at least in part to the availability of less complex cooling systems.

An additional benefit of molds made from high thermal conductivity materials is that a temperature profile for the mold is more uniform during the injection molding process than in conventional molds. In other words, there is less temperature variation from point to point within the mold. As a result, parts manufactured in molds with high thermal conductivity have less internal stress (and a more uniform crystalline structure) than parts manufactured in conventional molds. This lower internal stress and more uniform crystallinity result in lower rates of part warp. In conventional molds, the mold cavity is often designed to offset part warp due to non-uniform temperature gradients, which adds to the cost and complexity of conventional mold assemblies. Finalizing a particular offset usually requires an iterative and time consuming trial process. In high thermal conductivity molds, the mold cavity need not be designed to offset warp because the molded part does not experience a significant amount of warp, as internal stresses are more uniform due to the more uniform cooling. Thus, the iterative offset process used in the design of conventional molds may be avoided, further reducing manufacturing costs and time.

It is noted that the terms "substantially," "about," and "approximately," unless otherwise specified, may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Unless otherwise defined herein, the terms "substantially," "about," and "approximately" mean the quantitative comparison, value, measurement, or other representation may fall within 20% of the stated reference.

It should now be apparent that the various embodiments of the products illustrated and described herein may be produced by a low constant pressure injection molding process. While particular reference has been made herein to products for containing consumer goods or consumer goods products themselves, it should be apparent that the low constant pressure injection molding method discussed herein may be suitable for use in conjunction with products for use in the consumer goods industry, the food service industry, the transportation industry, the medical industry, the toy industry, and the like. Moreover, one skilled in the art will recognize the teachings disclosed herein may be used in the construction of stack molds, multiple material molds including rotational and core back molds, in combination with in-mold decoration, insert molding, in mold assembly, and the like.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A mold assembly for an injection molding machine, the mold assembly comprising:
    a first mold side and a second mold side, the first mold side and the second mold side defining a mold cavity therebetween;
    a first mold support plate corresponding with the first mold side and being disposed immediately adjacent to the first mold side, such that the first mold support plate is in complete contact with the first mold side, and remains in complete contact throughout the molding process, the first mold support plate physically supporting and reinforcing the first mold side and the first mold support plate being attached to a press, which activates to move the first and second mold sides during the molding process;
    and a cooling system for removing heat from the first mold side during an injection molding process, the cooling system including one or more cooling fluid channels, the one or more cooling channels being formed in the first mold support plate, but not in the first or second mold sides,
    wherein the first mold support plate includes a plurality of projections, the cooling fluid channels extend into the projections but not into the first mold side, and the first mold side being press fit within the projections.

2. The mold assembly of claim 1, wherein the cooling system includes a cooling fluid that circulates in a closed-loop cooling circuit through the one or more cooling fluid channels.

3. The mold assembly of claim 2, wherein the closed-loop cooling circuit is confined to the first mold support plate.

4. The mold assembly of claim 1, wherein the first mold side is made from materials having a thermal conductivity of greater than 30 BTU/HR FT ° F.

5. The mold assembly of claim 1, wherein the first mold support plate has an average thermal conductivity that is higher than the average thermal conductivity of the first mold side.

\* \* \* \* \*